United States Patent
Kobayashi et al.

(10) Patent No.: US 7,471,003 B2
(45) Date of Patent: Dec. 30, 2008

(54) VEHICULAR POWER CONTROL APPARATUS

(75) Inventors: Masaru Kobayashi, Tokyo (JP); Hirotoshi Maekawa, Tokyo (JP); Ryoji Nishiyama, Tokyo (JP); Yuji Kuramoto, Tokyo (JP); Kiyoharu Anzai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 381 days.

(21) Appl. No.: 11/450,342

(22) Filed: Jun. 12, 2006

(65) Prior Publication Data

US 2007/0093359 A1 Apr. 26, 2007

(30) Foreign Application Priority Data

Oct. 26, 2005 (JP) ............................ P2005-311141

(51) Int. Cl.
*F02D 29/06* (2006.01)
*H02P 9/04* (2006.01)
*H02P 1/00* (2006.01)
*H02P 3/00* (2006.01)
*H02P 5/00* (2006.01)
*F02D 11/10* (2006.01)
*F02M 51/00* (2006.01)

(52) U.S. Cl. .................... 290/40 C; 318/139; 123/399; 123/492

(58) Field of Classification Search ............... 290/40 C; 318/139; 123/399, 492
See application file for complete search history.

(56) References Cited

U.S. PATENT DOCUMENTS

| | | | | |
|---|---|---|---|---|
| 5,614,809 A | * | 3/1997 | Kiuchi et al. ................. | 322/11 |
| 5,789,882 A | * | 8/1998 | Ibaraki et al. ............... | 318/148 |
| 5,821,706 A | * | 10/1998 | Koga .......................... | 318/139 |
| 5,892,346 A | * | 4/1999 | Moroto et al. .............. | 318/587 |
| 5,898,282 A | * | 4/1999 | Drozdz et al. ............... | 318/139 |
| 5,969,496 A | * | 10/1999 | Yamada et al. .............. | 318/715 |
| 6,092,510 A | * | 7/2000 | Przymusinski et al. ...... | 123/478 |
| 6,223,721 B1 | * | 5/2001 | Bauer et al. ................. | 123/399 |
| 6,501,243 B1 | * | 12/2002 | Kaneko et al. .............. | 318/700 |
| 6,520,160 B2 | * | 2/2003 | Kojima et al. ............... | 123/492 |
| 6,624,529 B2 | * | 9/2003 | Obayashi .................. | 290/40 C |
| 6,897,629 B2 | * | 5/2005 | Wilton et al. ............... | 318/139 |
| 6,986,398 B2 | * | 1/2006 | Obayashi ................... | 180/65.2 |
| 2001/0032621 A1 | * | 10/2001 | Kojima et al. ............... | 123/492 |

(Continued)

FOREIGN PATENT DOCUMENTS

JP 5-33689 2/1993

(Continued)

*Primary Examiner*—Nicholas Ponomarenko
*Assistant Examiner*—Pedro J Cuevas
(74) *Attorney, Agent, or Firm*—Sughrue Mion, PLLC

(57) ABSTRACT

A protection operation control part switches a gate signal interruption switch for protection of power elements to a gate signal interruption side, and invalidates a switching signal from a hybrid control unit to place transistors into a nonconducting operation. A motor current signal from a motor current detector is converted into a current value by a motor current calculation unit, and is inputted to a short-circuit abnormality detection unit through a motor control arithmetic part, and a short-circuit abnormality is detected. At a time of detecting the short-circuit abnormality, an internal combustion engine operation instruction unit gives an instruction to an internal combustion engine control unit so as to limit output of an internal combustion engine, and releases a conduction state of an abnormal motor current.

9 Claims, 13 Drawing Sheets

U.S. PATENT DOCUMENTS

| | | | |
|---|---|---|---|
| 2002/0113441 A1* | 8/2002 | Obayashi | 290/40 C |
| 2004/0046394 A1* | 3/2004 | Lim | 290/40 C |
| 2004/0084232 A1* | 5/2004 | Obayashi | 180/65.2 |
| 2004/0174125 A1* | 9/2004 | Wilton et al. | 318/139 |
| 2004/0245947 A1* | 12/2004 | Wilton et al. | 318/139 |
| 2005/0269981 A1* | 12/2005 | Sakurai | 318/139 |
| 2006/0231304 A1* | 10/2006 | Severinsky et al. | 180/65.2 |
| 2006/0231305 A1* | 10/2006 | Severinsky et al. | 180/65.2 |
| 2006/0231306 A1* | 10/2006 | Severinsky et al. | 180/65.2 |
| 2008/0074819 A1* | 3/2008 | Sasaki et al. | 361/91.5 |
| 2008/0143298 A1* | 6/2008 | Yoshida | 320/136 |
| 2008/0149407 A1* | 6/2008 | Shibata et al. | 180/65.2 |

FOREIGN PATENT DOCUMENTS

| | | |
|---|---|---|
| JP | 09-233836 | 9/1997 |
| JP | 2003-081099 A | 3/2003 |
| JP | 2004-215328 | 7/2004 |
| JP | 2005-175439 A | 6/2005 |
| JP | 08-149868 | 6/2006 |

* cited by examiner

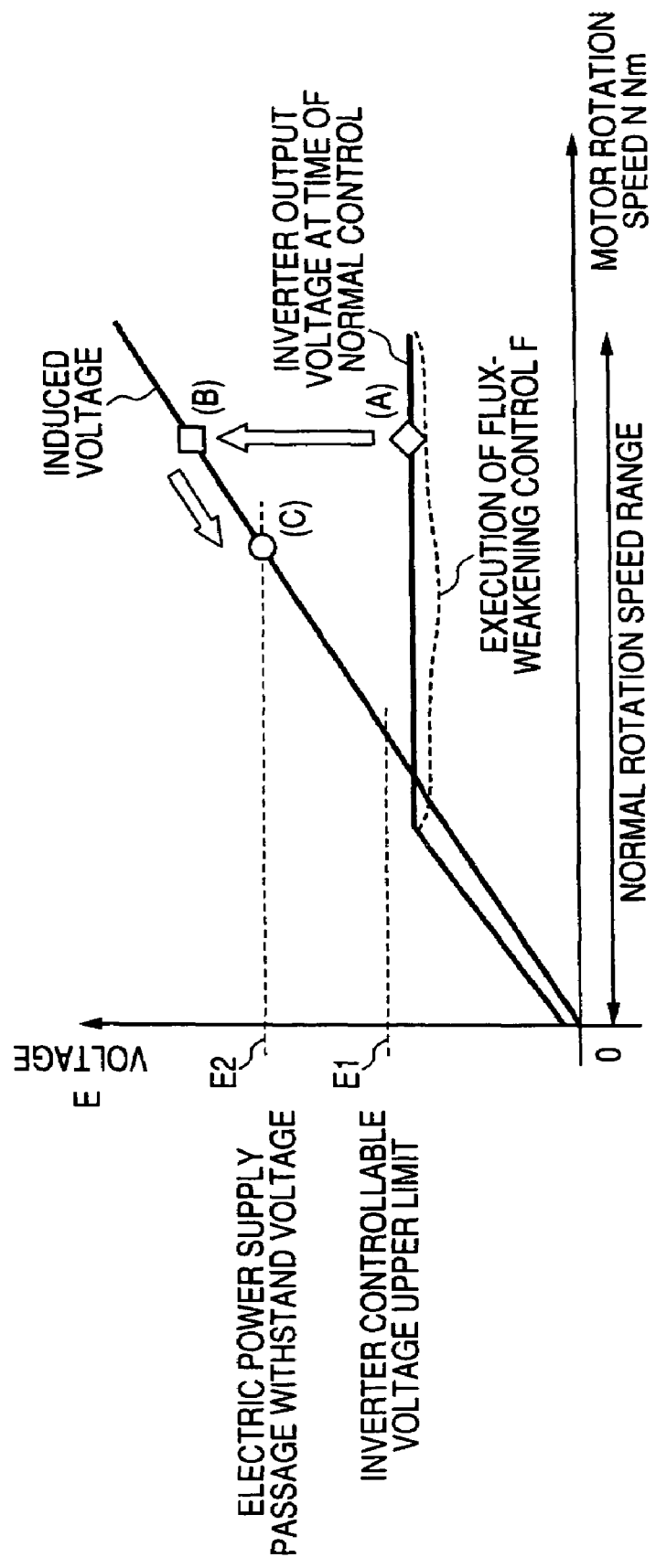

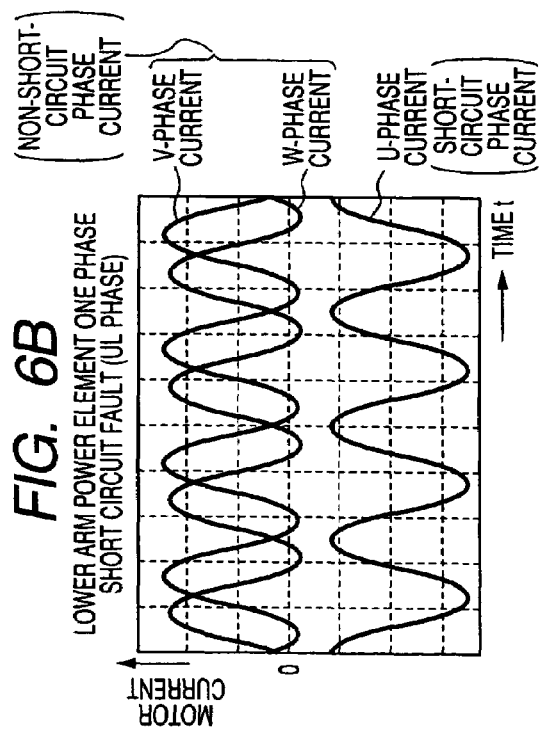
FIG. 6A NORMAL ALL TRANSISTORS OFF, DIODE FULL-WAVE RECTIFICATION STATE
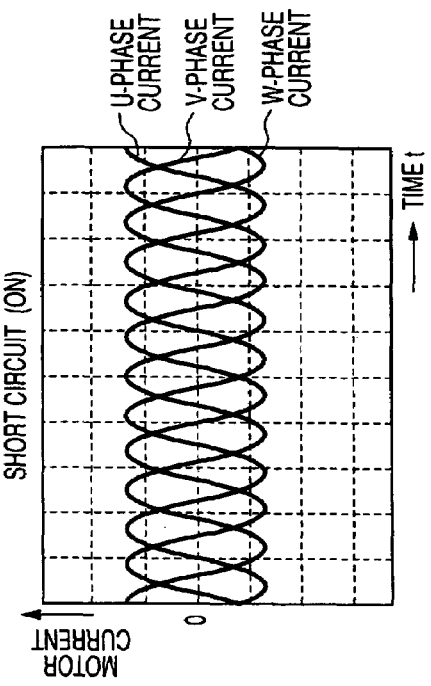
FIG. 6B LOWER ARM POWER ELEMENT ONE PHASE SHORT CIRCUIT FAULT (UL PHASE)
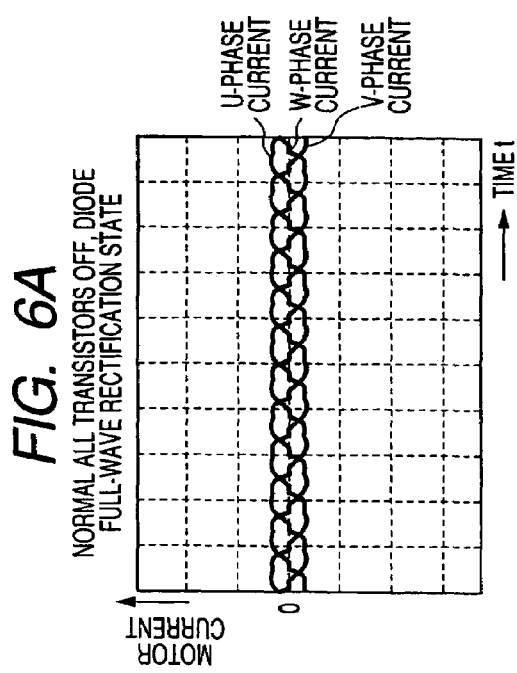
FIG. 6C LOWER ARM POWER ELEMENT TWO-PHASE SHORT CIRCUIT FAULT (UL AND VL PHASE)
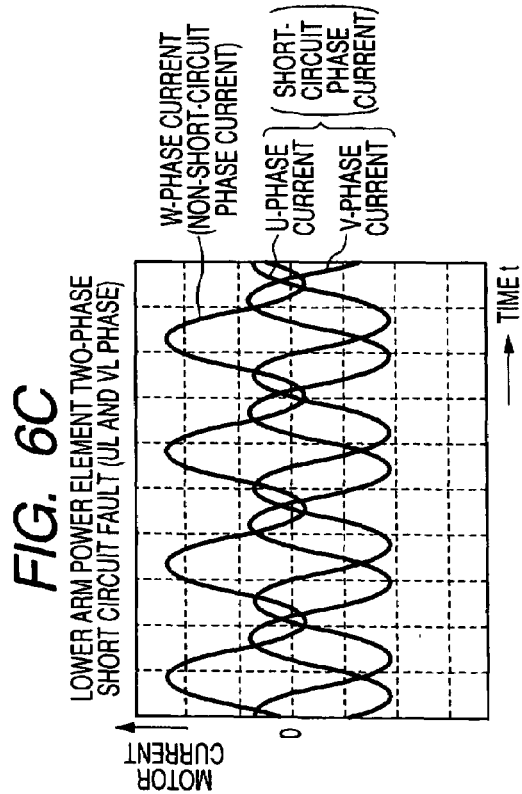
FIG. 6D LOWER ARM ALL PHASES SHORT CIRCUIT (ON)

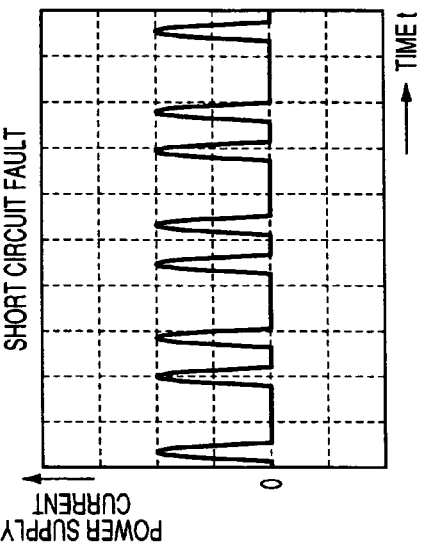
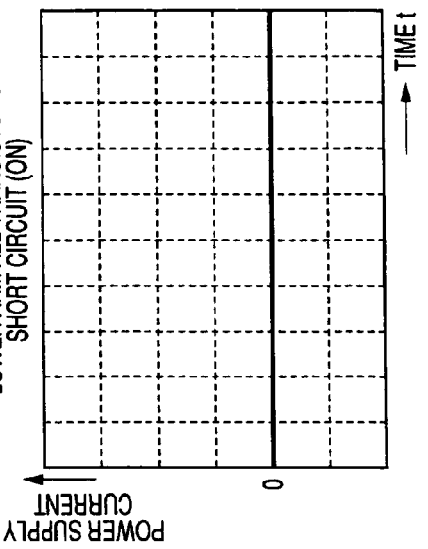
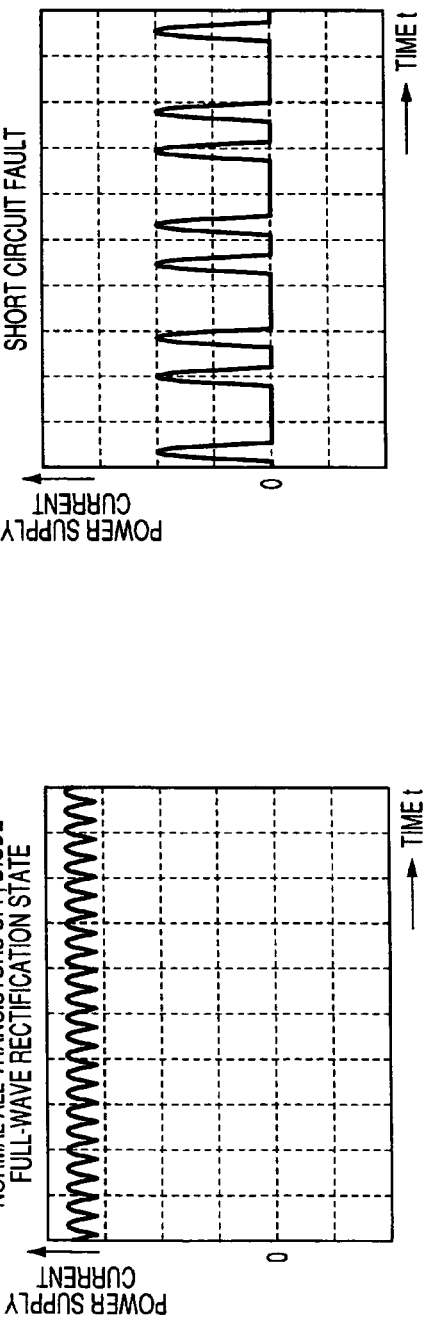
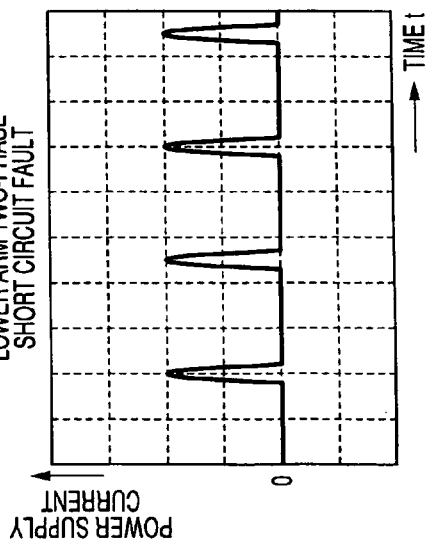

VEHICULAR POWER CONTROL APPARATUS

BACKGROUND OF THE INVENTION

1. Field of the Invention

The present invention relates to a vehicular power control apparatus to perform power control of a hybrid vehicle which uses an internal combustion engine and an AC motor as sources of power, and particularly to a vehicular power control apparatus which detects an abnormality due to a short circuit fault of a component part of an electric power converter for converting DC power into AC power and supplying it to an AC motor, and performs power control in accordance with the abnormality.

2. Description of the Related Art

Conventionally, there is used a power control apparatus for a hybrid vehicle, which includes an internal combustion engine, its control apparatus, an AC motor, an electric power converter to supply AC power to the AC motor and its control apparatus, and combines both the output of the internal combustion engine and the output of the AC motor to use them as the sources of power of the vehicle. The electric power converter is an apparatus to mutually convert DC power and AC power, and at the time when the AC motor is driven, the DC power supplied from the DC power supply is converted into the AC power and is supplied to the AC motor, and the AC motor is driven. Besides, at the time of braking of the AC motor, the AC power generated by the AC motor is converted into the DC power and is supplied to the DC power supply, and the AC motor is made to perform a regenerative operation.

The electric power converter incorporates, as a switching unit, a semiconductor power element (hereinafter referred to as a power element) including a transistor such as, for example, an IGBT (Insulated Gate Bipolar Transistor) and a diode, and is constructed to perform electric power conversion by the conducting (ON) and nonconducting (OFF) operation of the power element caused by switching signals outputted from the control apparatus.

Incidentally, it is of course that the power element as the switching unit can be made of a semiconductor element other than the IGBT.

The control of the output of the AC motor used in the hybrid vehicle is generally performed by controlling its output torque quantity. The output torque quantity is changed in correlation with the amount of current flowing to the AC motor, and as the amount of current becomes large, the amount of output torque is increased. From this, the output control of the AC motor is performed by controlling the amount of the flowing current. Since the current flowing through the AC motor flows also to the power element, in the case where the amount of current is large, that is, in the case where the amount of output torque is large, the amount of heat generation is also large by the resistance component of the power element, and the degree of temperature rise of the power element becomes large.

Besides, as the characteristic of the power element, there is a case where the gate applied voltage by a switching signal given to the gate portion does not reach a suitable standard, and the switching element performs the conducting operation in an unsaturated region. In this case, since the resistance component of the power element becomes large, the amount of heat generation becomes large even for the same amount of current, and the temperature of the power element rises.

In the case where the IGBT is used as the power element, when the temperature of the IGBT rises, the amount of current which can be interrupted at the time of the nonconducting operation becomes low, and it is damaged by the occurrence of latch-up. Thus, for the purpose of protecting the power element, a protection operation is often used in which in the case where a large current not lower than a specified value flows (ON; Over Current), or in the case where the temperature rises up to a specified value or higher (OT; Over Temperature), or in the case where the gate applied voltage at the time of the conducting (ON) operation becomes a specified value or lower (UV; Under Voltage), even in the case where a conducting (ON) operation instruction is given from outside, this instruction is made invalid to forcibly interrupt the switching signal and to make the power element nonconducting (OFF).

The protection operation by the interruption of the switching signal is continuously performed over a specified period of about 10 [ms], and after the specified period is ended, the interruption of the switching signal is stopped and the protection operation is released. Besides, the state that the protection operation is being performed is notified to a control arithmetic unit as a generation source of the switching signal by a protection operation identifying signal (FO; Fault Output). The control arithmetic unit judges whether the motor operation should be continued or stopped according to the recognition of the protection operation identifying signal FO or the recognition of intermittent occurrence of the continuous protection identifying signal FO in the short time, and in the case where a judgment is made that the operation should be stopped, the switching signal is stopped, and an operation is perform to keep the nonconducting state.

That is, the conventional power control apparatus for the hybrid vehicle as stated above stops the operation of the AC motor by stopping the switching of the power element of the electric power converter, and releases the abnormal state and avoids the dangerous state of the vehicle.

However, in the case where the power element is subjected to a short circuit fault, even if the interruption of the switching signal, that is, the protection operation by the gate interruption, or the keeping of the nonconducting (OFF) state by the stop of the switching signal from the control arithmetic unit is performed, a large current continues to flow according to the rotation state of the AC motor, and the abnormal operation of the AC motor can not be stopped. This occurs because the balance of voltages in respective phases applied to lines of the AC motor is lost since the terminal voltage of the AC motor becomes equal to the potential of the electric power converter at the DC side by the short circuit fault of the power element.

Besides, in a permanent magnet type AC motor in which a permanent magnet is used as a rotator magnetic pole to generate a magnetic flux, even if the switching of the power element is stopped, an induced voltage proportional to the rotation speed of the rotator magnetic pole is generated in an armature winding and it operates as a generator. Thus, when the rotation speed of the AC motor is kept to be high, a large current continues to flow to an electric power supply passage.

The permanent magnet type AC motor often used for the hybrid vehicle is designed so that in addition to the request for miniaturization and reduction in weight, the amount of magnetic flux of the permanent magnet relatively becomes large with respect to a volume, and therefore, there is a tendency that the ratio of the induced voltage to the rotation speed becomes high. Thus, in the case where the rotation speed rises and exceeds the upper limit in which the electric power converter can control the output, the so-called flux-weakening control is performed in which the phase of an applied voltage with respect to the rotation angle of the rotator is adjusted, and the increase of a motor terminal voltage is suppressed.

Here, in the case where the nonconducting (OFF) state of the power element is kept for protection against occurrence of some abnormality, the flux-weakening control of the AC motor is not performed, and therefore, a high voltage exceeding the rating is applied to the electric power converter and the AC motor, and further, in the case where the power element is subjected to a short circuit fault, a large current exceeding the rating continues to flow to the electric power converter and the AC motor. Thus, a large current exceeding the voltage resistance and heat resistance of component parts forming the electric power supply passage, such as the power element, a connection terminal between the electric power converter and the AC motor, and the armature winding of the AC motor, and there is a fear of the occurrence of possibility that a secondary fault such as smoking, burnout or dielectric breakdown occurs. The occurrence of the smoking, burnout or dielectric breakdown is an important problem relating to the safety of the vehicle, and it is necessary to prevent those from occurring.

Then, conventionally, in order to cope with such a problem, it is proposed that a fusible part functioning as a fuse is provided as an electrode member to connect a semiconductor portion of a power element and an external current passage, and when a current of a specified value or higher flows, the fusible part is fused to cut the circuit (for example, see patent document 1 (JP-A-2005-175439, pages 2 to 12, FIGS. 1 to 14)).

Besides, in this related art, it is exemplified that the fusible part is constructed of a bonding wire having a structure different from the electrode member.

However, even in the conventional vehicular power control apparatus using the power element disclosed in patent document 1, there are following problems:

(1) Since the principle that the fusible part of the power element is fused is based on melting by heat generation from the resistance component of the fusible part, as compared with a power element having no fusible part, the resistance value of the fusible part is high, and therefore, an unnecessary loss always occurs, and the balance to cooling performance and characteristics relating to efficiency are deteriorated.

(2) The fusible part is inserted in series to the electric power supply passage, and in the case where the fusible part is erroneously fused, the vehicular power control apparatus does not normally operate, and the reliability of the apparatus is lowered.

(3) When the fusing current value is set to be low so that the fusible part is certainly fused at the time of the short circuit fault of the power element, the fusing current set value can be smaller than the permissible current of the semiconductor portion of the power element, and therefore, the rated current capacity in the whole power element is lowered. On the other hand, when the fusing current value of the fusible part is set to be high, even if the power element is already subjected to the short circuit fault and an abnormal current flows, it becomes impossible to certainly fuse the part.

(4) In the case where the fusible part of the power element is constructed of the bonding wire, and the power element is molded with an injection molding resin for insulation, poor contact occurs in the bonding part, or a contact portion between the cut place of the bonding wire body and another portion, and there is a possibility that the conduction of current becomes intermittent. In such a case, an arc by a high voltage occurs at the poor contact place, and there is a possibility that the mold member smokes or fires.

The above problem (4) in the combination of the bonding wire and the insulating injection mold resin mold is also the worrying problem in the structure of the semiconductor element body. Conventionally, there is provided a power element in which an electrode of a semiconductor element and a metal plate positioned around the semiconductor element and to form a current flow passage are electrically connected to each other by many bonding wires, and these are integrally molded with resin to be insulated and are fixed. Although the power element constructed in this way effectively contributes to the improvement of performance relating to vibration resistance, temperature change resistance characteristic, heat radiation characteristic and the like, the problem as recited in the above (4) can arise. Besides, when the short circuit fault occurs, the resistance value at the fault place is lowered, uniform current does not flow to the respective bonding wires, and the current is concentrated on the wire around the fault place and unevenly flows. As stated above, when the current is concentrated on the place of the short circuit fault and flows, the possibility of the smoking and firing becomes high.

On the other hand, because of the restriction of a process time and process area of a bonding part in the case where a bonding wire is connected to a semiconductor by bonding, in order to realize miniaturization and reduction in cost of a power element, a direct lead bonding (DLB) system is proposed in which instead of a wire, a metal plate is connected to a semiconductor to achieve electrical connection. In this direct lead bonding system, the unevenness of the current as in the wire bonding system hardly occurs, and an arc due to poor contact of a connection part also does not occur, and therefore, the possibility of the smoking and firing is suppressed to be low. However, even in the power element of the direct lead bonding system, there is an unsolved problem that when the motor rotation speed is kept to be high at the time of a short circuit fault, a large current continuously flows to the electric power supply passage.

SUMMARY OF THE INVENTION

The invention has been made to solve the problems of the conventional apparatus as described above and has an object to provide a vehicular power control apparatus in which in a case where a short circuit fault occurs in an electric power supply passage including a DC power supply, an electric power converter and an AC motor, it is possible to prevent that a large current exceeding the rating continues to flow, and exceeds the voltage resistance, current resistance or heat resistance of component parts of the electric power supply passage, such as a power element, a connection terminal between the electric power converter and the AC motor, and a motor winding, and a secondary fault, such as smoking, burnout or dielectric breakdown, occurs.

Besides, another object of the invention is to provide a vehicular power control apparatus which can prevent the occurrence of a secondary fault, such as smoking, burnout or dielectric breakdown, without causing a problem, such as an increase of loss, lowering of reliability, or deterioration of balance to cooling performance, due to the incorporation of a fusible portion into a power element as in the convention apparatus.

Further, another object of the invention is to provide a vehicular power control apparatus which can prevent the occurrence of a secondary fault, such as smoking, burnout or dielectric breakdown, at low cost by only changing software elements without changing hardware elements constituting a conventional hybrid vehicular power control apparatus.

According to an aspect of the invention, a vehicular power control apparatus is a vehicular power control apparatus to perform power control of a hybrid vehicle using output of an internal combustion engine and output of an AC motor as sources of power, and includes an internal combustion engine control unit to control the output of the internal combustion engine, an electric power converter that is connected to the AC motor and a DC power supply to form, together therewith, an electric power supply passage, performs power conversion by a switching operation of a switching unit and supplies electric power from one of the DC power supply and the AC motor to the other, a hybrid control unit that has a function to control the output of the AC motor by controlling the switching operation of the electric power converter and cooperates with the internal combustion engine control unit to perform an arithmetical operation for the power control of the hybrid vehicle, a short-circuit abnormality detection unit that is provided in the hybrid control unit and detects an abnormality due to a short circuit fault of the electric power supply passage, and an internal combustion engine operation instruction unit that is provided in the hybrid control unit and gives, when the short-circuit abnormality detection unit detect the abnormality, an instruction, which causes the internal combustion engine to perform an operation corresponding to the abnormality, to the internal combustion engine control unit.

Besides, in the vehicular power control apparatus according to another aspect of the invention, the short-circuit abnormality detection unit is constructed to detect the abnormality due to the short circuit fault based on information relating to switching of the electric power converter and information relating to a current flowing to the AC motor.

Besides, in the vehicular power control apparatus according to another aspect of the invention, the short-circuit abnormality detection unit is constructed to detect the abnormality due to the short circuit fault based on information relating to the amount of instruction of output control of the AC motor and information relating to a current flowing to the DC power supply.

The vehicular power control apparatus according to another aspect of the invention further includes a temperature detector to measure temperature of at least one of the switching unit of the electric power converter and the electric power supply passage, and the short-circuit abnormality detection unit detects the abnormality due to the short circuit fault based on information relating to the amount of instruction of output control of the AC motor, information relating to switching of the electric power converter, and information relating to the temperature detected by the temperature detector.

Besides, in the vehicular power control apparatus according to another aspect of the invention, the internal combustion engine operation instruction unit is constructed to give an operation instruction, which is adapted to a degree of the abnormality due to the short circuit fault obtained based on at least one of information relating to temperature of the electric power supply passage and information relating to a current flowing to the electric power supply passage, to the internal combustion engine control unit.

Besides, in the vehicular power control apparatus according to another aspect of the invention, the information relating to the current is information relating to at least one of a conduction mode of the current and a current value.

Besides, in the vehicular power control apparatus according to another aspect of the invention, the internal combustion engine operation instruction unit is constructed to give an operation instruction adapted to a vehicle operation state of the hybrid vehicle to the internal combustion engine control unit.

Besides, in the vehicular power control apparatus according to another aspect of the invention, the internal combustion engine operation instruction unit is constructed to give an instruction, which limits a rotation speed of the internal combustion engine by changing an output adjustment parameter of the internal combustion engine based on an internal combustion engine output upper limit characteristic at a time of the abnormality calculated based on a correlation among a rotation speed of the AC motor, temperature of the electric power supply passage, a current flowing to the electric power supply passage, and a rotation speed of the internal combustion engine, to the internal combustion engine control unit.

Besides, in the vehicular power control apparatus according to another aspect of the invention, the internal combustion engine operation instruction unit is constructed to give an instruction, which limits a rotation speed of the internal combustion engine by changing an output adjustment parameter of the internal combustion engine to perform traveling continuation or traveling stop of the vehicle in conformity with a degree of the abnormality obtained based on vehicle operation information including at least one of an acceleration/declaration amount of the hybrid vehicle, an acceleration/declaration frequency, a steering amount, a steering frequency, and a vehicle speed and temperature of the electric power supply passage and/or a current flowing to the electric power supply passage, to the internal combustion engine control unit.

The vehicular power control apparatus according to the invention includes the electric power converter that is connected to the AC motor and the DC power supply to form, together therewith, the electric power supply passage, performs the power conversion by the switching operation of the switching unit and supplies the electric power from one of the DC power supply and the AC motor to the other, the hybrid control unit that has the function to control the output of the AC motor by controlling the switching operation of the electric power converter and cooperates with the internal combustion engine control unit to perform the arithmetical operation for the power control of the hybrid vehicle, the short-circuit abnormality detection unit that is provided in the hybrid control unit and detects the abnormality due to the short circuit fault of the electric power supply passage, and the internal combustion engine operation instruction unit that is provided in the hybrid control unit and gives, when the short-circuit abnormality detection unit detects the abnormality, the instruction, which causes the internal combustion engine to perform the operation corresponding to the abnormality, to the internal combustion engine control unit, and therefore, even if the abnormality due to the short circuit fault of the electric power supply passage occurs, it is possible to prevent that a large current exceeding the rating continues to flow and exceeds the voltage resistance, current resistance or heat resistance of a component part, such as the switching unit, a connection terminal between the electric power converter and the AC motor, and a motor winding, and a secondary fault, such as smoking, burnout or dielectric breakdown, occurs.

Further, according to the vehicular power control apparatus of the invention, the short-circuit abnormality detection unit is constructed to detect the abnormality due to the short circuit fault based on the information relating to the switching of the electric power converter and the information relating to the current flowing to the AC motor, and therefore, the abnormality due to the short circuit fault can be detected based on the information relating to the motor current which can be used also for the control of the AC motor, and the occurrence of the secondary fault can be prevented without adding special hardware elements, at low cost, and with high reliability.

Besides, according to the vehicular power control apparatus of the invention, the short-circuit abnormality detection unit is constructed to detect the abnormality due to the short circuit fault based on the information relating to the amount of the instruction of the output control of the AC motor and the information relating to the current flowing to the DC power supply, and therefore, the abnormality due to the short circuit fault can be detected based on the information of the power supply current which can be used also for the electric power calculation of the AC motor or the DC power supply, and the occurrence of the secondary fault can be prevented without adding special hardware elements, at low cost, and with high reliability.

Besides, the vehicular power control apparatus of the invention further includes the temperature detector to measure the temperature of at least one of the switching unit of the electric power converter and the electric power supply passage, and the short-circuit abnormality detection unit detects the abnormality due to the short circuit fault based on the information relating to the amount of the instruction of the output control of the AC motor, the information relating to the switching of the electric power converter, and the information relating to the temperature detected by the temperature detector, and therefore, the abnormality due to the short circuit fault can be detected based on the temperature information which can be used for the output limitation for overheat protection of the switching unit and correction of the electric characteristic of the switching unit in the control arithmetical operation of the AC motor, and/or the temperature information which can be used for the correction of the electric circuit characteristic of the electric power supply passage and the trouble detection of a cooling apparatus of the electric power converter, and the occurrence of the secondary fault can be prevented without adding special hardware elements, at low cost, and with high reliability.

Besides, according to the vehicular power control apparatus of the invention, the internal combustion engine operation instruction unit is constructed to give the operation instruction, which is adapted to the degree of the abnormality due to the short-circuit fault obtained based on at least one of the information relating to the temperature of the electric power supply passage and the information relating to the current flowing to the electric power supply passage, to the internal combustion engine control unit, and therefore, the degree of urgency for avoiding the secondary fault is divided into stages according to the degree of the abnormality, the instruction to the internal combustion engine control unit can be set correspondingly to each of the stages, and the processing method of preventing the occurrence of the secondary fault can be finely related to the degree of the abnormality due to the short circuit fault and can be operated.

Besides, according to the vehicular power control apparatus of the invention, the information relating to the current for obtaining the degree of the abnormality is the information relating to at least one of the conduction mode of the current and the current value, and therefore, the degree of the abnormality due to the short circuit fault can be certainly judged, and the processing method of preventing the occurrence of the secondary fault can be more certainly and finely related to the degree of the abnormality due to the short circuit fault and can be operated.

Besides, according to the vehicular power control apparatus of the invention, the internal combustion engine operation instruction unit is constructed to give the operation instruction adapted to the vehicle operation state of the hybrid vehicle to the internal combustion engine control unit, and therefore, the occurrence of the secondary fault can be avoided while the power control of the internal combustion engine is performed in view of the coordination with the operation of the other control mechanism relating to vehicle traveling so as not to damage the safety of the driving.

Besides, according to the vehicular power control apparatus of the invention, the internal combustion engine operation instruction unit is constructed to give the instruction, which limits the rotation speed of the internal combustion engine by changing the output adjustment parameter of the internal combustion engine based on the internal combustion engine output upper limit characteristic at the time of the abnormality calculated based on the correlation among the rotation speed of the AC motor, the temperature of the electric power supply passage, the current flowing to the electric power supply passage, and the rotation speed of the internal combustion engine, to the internal combustion engine control unit, and therefore, even if the short circuit fault occurs, the rotation speed of the internal combustion engine is limited, and it is possible to avoid the occurrence of the secondary fault due to the application of a high voltage exceeding the rating or large current conduction.

Besides, according to the vehicular power control apparatus of the invention, the internal combustion engine operation instruction unit is constructed to give the instruction, which limits the rotation speed of the internal combustion engine by changing the output adjustment parameter of the internal combustion engine to perform the traveling continuation or traveling stop of the vehicle in conformity with vehicle operation information including at least one of an acceleration/declaration amount of the hybrid vehicle, an acceleration/declaration frequency, a steering amount, a steering frequency and a vehicle speed, and a degree of the abnormality obtained based on temperature of the electric power supply passage and/or a current flowing to the electric power supply passage, to the internal combustion engine control unit, and therefore, when the abnormality due to the short circuit fault is detected, the degree of urgency for avoiding the secondary fault is determined correspondingly to the degree of the abnormality due to the short circuit fault estimated from the temperature of the electric power supply passage or the amount of the current, the processing of the internal combustion engine power control to perform the traveling continuation or traveling stop of the vehicle is selected, the temporal transition of the processing of the internal combustion engine power control or the start point of the processing can be adjusted from the vehicle operation state such as the acceleration/declaration amount of the vehicle, the acceleration/declaration frequency, the steering amount, the steering frequency and the vehicle speed, and the control having very high reliability can be performed.

BRIEF DESCRIPTION OF THE DRAWINGS

FIG. 4 is an explanatory view showing a relation between motor rotation speed and induced voltage in the vehicular power control apparatus according to embodiment 1 of the invention;

FIGS. 6A to 6D are waveform views of motor currents for explaining the presence/absence of a short circuit fault in the vehicular power control apparatus according to embodiment 1 of the invention;

FIGS. 12A to 12D are waveform views of power supply currents for explaining the presence/absence of a short circuit fault in the vehicular power control apparatus according to embodiment 2 of the invention.

DETAILED DESCRIPTION OF THE INVENTION

Embodiment 1

Figure 1:
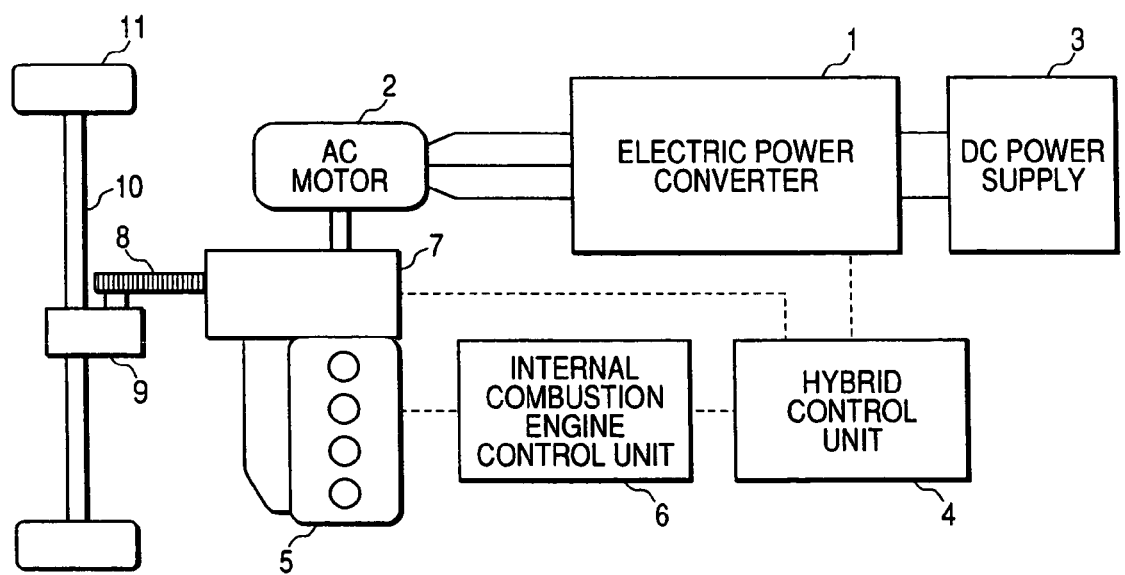
FIG. 1 is a structural view of a hybrid vehicle including a vehicular power control apparatus according to embodiment 1 of the invention.

FIG. 1 is a structural view of a hybrid vehicle including a vehicular power control apparatus according to embodiment 1 of the invention. In FIG. 1, an electric power converter 1 includes a switching unit as described later, converts DC power supplied from a DC power supply 3 into AC power by a switching operation of the switching unit, and supplies the converted AC power to an AC motor 2. The AC motor 2 operates as a motor by being supplied with the AC power from the electric power converter 1, and its output is used as power to drive the vehicle.

On the other hand, the electric power converter 1 has also a function to convert AC power generated in an armature winding of the AC motor into DC power by the switching operation of the switching unit, and to supply the converted DC power to the DC power supply 3. In this case, the AC motor 2 functions as a generator, and the vehicle is placed in a regenerative braking state by the AC motor 2.

The DC power supply 3, the electric power converter 1 and the AC motor 2 form an electric power supply passage to supply electric power from the DC power supply 3 through the electric power converter 1 to the AC motor 2, or to supply electric power from the AC motor 2 through the electric power converter 1 to the DC power supply 3.

A hybrid control unit 4 calculates the target amount of power of an internal combustion engine 5 and that of the AC motor 2 so that the hybrid vehicle suitably operates in relation to fuel consumption, exhaust gas, ride quality and the like, and gives an operation instruction of the internal combustion engine 5 to an internal combustion engine control unit 6. Besides, the hybrid control unit 4 calculates an operation instruction to the AC motor 2, performs a control arithmetical operation based on this calculation, and outputs a switching signal to the switching unit of the electric power converter 1.

As the DC power supply 3 to supply electric power to the AC motor 2 through the electric power converter 1, a lithium-ion secondary battery, a nickel-hydrogen secondary battery, or a combination of a fuel cell and a secondary battery or an electric double layer capacitor is used, and further, a combination of the DC power supply 3 and a step-up-and-down DC-DC converter to convert its output voltage into a different voltage is used.

Both the power as the output of the AC motor 2 and the power as the output of the internal combustion engine 5 are transmitted to a transmission 7, and the total power obtained by adding the power of the AC motor 2 and the power of the internal combustion engine 5 is outputted to a speed reduction gear 8. The total power decelerated by the speed reduction gear 8 is transmitted to a driving wheel 11 of the vehicle through a differential gear 9 and a drive shaft 10, and the vehicle makes a forward movement or a backward movement by the rotation of the driving wheel 11.

The internal combustion engine 5 operates in accordance with the result of the control arithmetical operation of the internal combustion engine control unit 6. The transmission 7 and the AC motor 2 operate in accordance with the result of the control arithmetical operation of the hybrid control unit 4.

Next, a description will be given to, as the basis of embodiment 1 of the invention, a basic operation relating to the output control of the AC motor and a state at the time of occurrence of a short circuit fault in the electric power supply passage.

Figure 2:
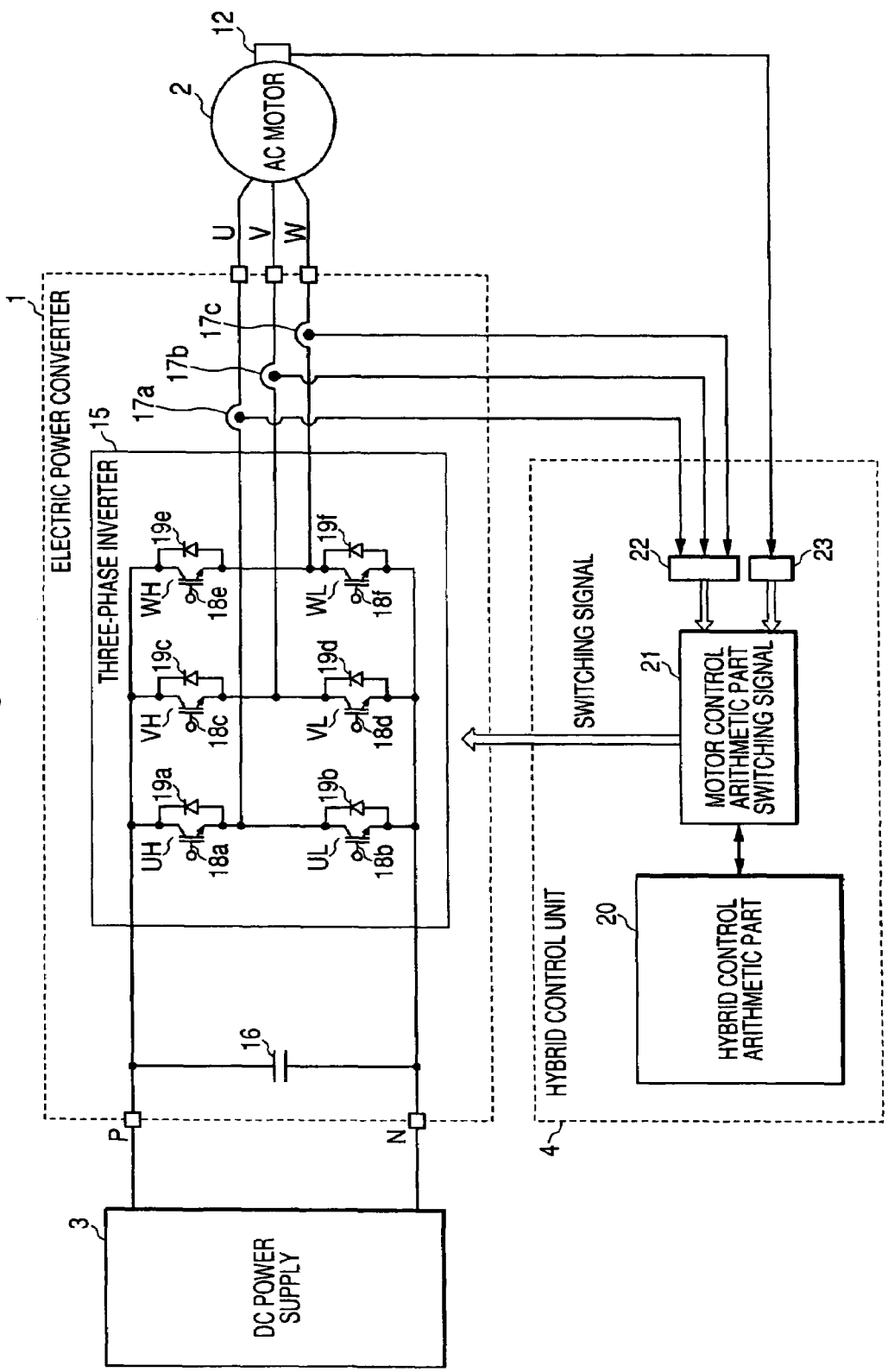
FIG. 2 is a block diagram showing a structure relating to power control of a motor in the vehicular power control apparatus according to embodiment 1 of the invention.

FIG. 2 is a block diagram showing a structure relating to the output control of an AC motor 2 in a power control apparatus for a hybrid vehicle, and shows a case where AC power is three-phase electric power. Incidentally, the same symbol as that of FIG. 1 denotes the same portion.

In FIG. 2, an electric power converter 1 includes a three-phase inverter 15, a smoothing capacitor 16, a U-phase motor current detector 17a, a V-phase motor current detector 17b, and a W-phase motor current detector 17c. A U-phase winding, a V-phase winding and a W-phase winding provided on the stator of the AC motor 2 are respectively connected to output terminals U, V and W of the electric power converter 1. A rotation angle detector 12 to detect a rotation angle of the rotator is provided in the AC motor 2.

The three-phase inverter 15 includes power elements UH, UL, VH, VL, WH and WL each of which includes a transistor 18a, 18b, 18c, 18d, 18e or 18f and a flywheel diode 19a, 19b, 19c, 19d, 19e or 19f connected in anti-parallel therewith. Each of the power elements UH, UL, VH, VL, WH and WL constitutes the switching unit of the electric power converter 1.

Besides, there are provided three arms each including the two power elements connected in series to each other, and a connection point of the two power elements in each of the arms is connected to one of the U-phase winding, the V-phase winding and the W-phase winding of the AC motor 2. Both ends of each of the arms of the three-phase invert 15 are respectively connected to a high potential side output terminal P and a low potential side output terminal N of a DC power supply source 3.

A hybrid control unit 4 includes a hybrid control arithmetic part 20, a motor control arithmetic part 21, a motor current calculation unit 22, and a rotation angle speed calculation unit 23. The motor current calculation unit 22 calculates a motor current value based on motor current signals from the current detector 17a to detect a U-phase motor current, the current detector 17b to detect a V-phase motor current, and the current detector 17c to detect a W-phase motor current, and inputs the calculated value to the motor control arithmetic part 21. The rotation angle speed calculation unit 23 calculates a rotation angle speed of the rotator of the AC motor 2 based on an output signal from the rotation angle detector 12, and inputs the calculated value to the motor control arithmetic part 21.

Next, the operation of the vehicular power control apparatus constructed as stated above will be described.

First, the basic operation relating to the output control of the AC motor 2 is as follows. That is, the target power of the AC motor 2, that is, the target output is calculated by the hybrid control arithmetic part 20, and an instruction based on the calculated target output is given to the motor control arithmetic part 21. Since the power as the output of the AC motor 2 is the product of the rotation speed of the AC motor 2 and the output torque, the instruction given to the motor control arithmetic part 21 may be a target torque previously obtained by dividing the target power by the rotation speed, or it may be the target power itself.

Besides, as information indicating an actual operating state of the AC motor 2, motor current signals from the current detectors 17a to 17c to detect currents of the U-phase, V-phase and W-phase of the AC motor 2 and the rotation angle signal from the rotation angle detector 12 are inputted to the hybrid control unit 4. The motor current signals from the respective current detectors 17a to 17c are converted into current values by the motor current calculation unit 22, and are inputted to the motor control arithmetic part 21. Besides, the rotation angle speed calculation unit 23 calculates a rotation speed we from the rotation angle θ of the rotator of the AC motor 2 and a change amount of the rotation angle per unit time based on the rotation angle signal from the rotation angle detector 12, and inputs the calculated value to the motor control arithmetic part 21. Incidentally, each of the motor current calculation unit 22 and the rotation angle calculation unit 23 has an interface circuit made of an electronic part to process an electric quantity signal.

The motor control arithmetic part 21 performs an arithmetical operation for AC motor control by a well-known method such as, for example, a vector control method of an AC motor. The vector control method is a method in which as is well known, an AC current flowing to the armature winding of the AC motor 2 is decomposed into a component parallel to a rotating magnetic flux and a component orthogonal thereto, switching of the three-phase inverter 15 is controlled so that the respective decomposed components coincide with a target current value of a component parallel to the rotating magnetic flux among target current values converted from the target torque and a target current value of a component orthogonal to the rotating magnetic flux, voltage applied to the terminals of the AC motor 2 is adjusted, and the output of the AC motor 2 is controlled.

In this vector control method, rectangular coordinates rotating in synchronization with the rotating magnetic flux are imagined, the coordinate axis parallel to the rotating magnetic flux is called a d-axis, the coordinate axis orthogonal to the rotating magnetic flux is called a q-axis, and besides, among motor currents, a current component parallel to the rotating magnetic flux is called a d-axis current, and a current component orthogonal to the rotating magnetic flux is called a q-axis current. The motor control arithmetic part 21 performs a feedback control arithmetical operation in which a target current and an actual current are checked with each other by, for example, a proportional plus integral (PI) arithmetical operation or the like, and calculates three-phase target voltages Vu*, Vv* and VW* so that a d-axis current id and a q-axis current iq respectively coincide with a d-axis target current id* and a q-axis target current iq*.

Next, the motor control arithmetic part 21 generates switching signals to be given to the respective power elements UH, UL, VH, VL, WH and WL so that voltages in accordance with the three-phase target voltages Vu*, Vv* and Vw* are applied to the respective phase terminals of the AC motor 2. This switching signals perform pulse width modulation (PWM) control of output voltages of the three-phase inverter 15 by controlling intervals of conduction and nonconduction of the respective power elements UH, UL, VH, VL, WH and WL.

The three-phase inverter 15 is subjected to pulse width modulation control by the switching signals from the motor control arithmetic part 21 to generate output voltages in accordance with the three-phase target voltages Vu*, Vv* and Vw*, and applies the output voltages to the respective phase terminals of the armature windings of the AC motor 2. The AC motor 2 is driven by the output voltages of the three-phase inverter 15, and desired power control is performed.

Figure 3:
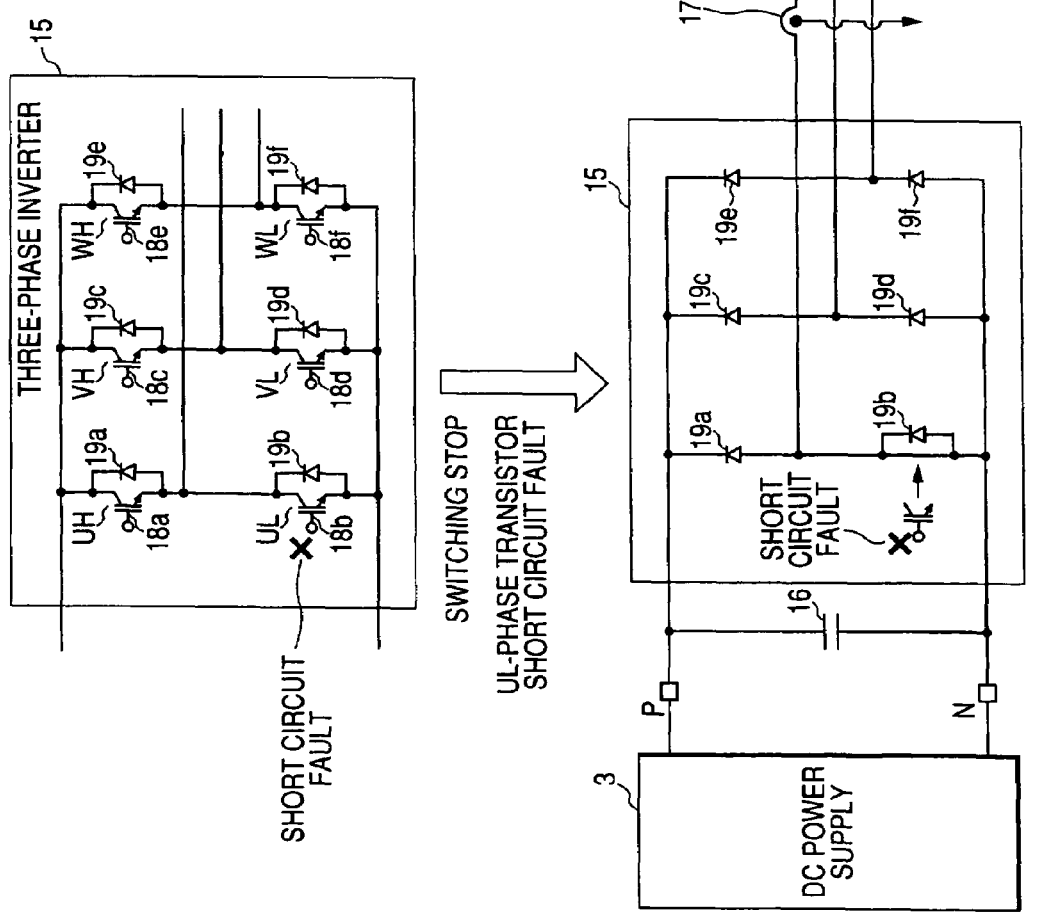
FIG. 3 is an explanatory view for explaining the vehicular power control apparatus according to embodiment 1 of the invention.

Next, a description will be given to the state of the electric power supply passage at the time of the occurrence of a short circuit fault. FIG. 3 is an explanatory view showing an internal electric circuit of the AC motor 2.

In FIG. 3, the armature windings of the U-phase, V-phase and W-phase of the AC motor 2 are expressed by series connection bodies of self-inductances 52a, 52b and 52c, armature resistances 53a, 53b and 53c and voltage sources (induced voltages) eu, ev and ew. Each value of the armature resistances 53a, 53b and 53c of the respective phases is denoted by Ra, and each value of the self-inductances 52a, 52b and 52c is denoted by La. One ends of the series connection bodies of the respective phases are connected to a neutral point c, and the other ends are respectively connected to motor terminals of the respective phases. Although not shown, mutual inductances exist between the respective series connection bodies, and the mutual inductance between the U phase and the V phase is denoted by Muv, the mutual inductance between the V phase and the W phase is denoted by Mvw, and the mutual inductance between the W phase and the U phase is denoted by Mwu.

Here, with respect to the terminal voltages of the AC motor 2 and the armature currents, a following equation is established.

$$\begin{bmatrix} v_u \\ v_v \\ v_w \end{bmatrix} = \begin{bmatrix} R_a \frac{dL_u}{dt} & \frac{dM_{uv}}{dt} & \frac{dM_{wu}}{dt} \\ \frac{dM_{uv}}{dt} & R_a + \frac{dL_v}{dt} & \frac{dM_{vw}}{dt} \\ \frac{dM_{wu}}{dt} & \frac{dM_{vw}}{dt} & R_a + \frac{dL_w}{dt} \end{bmatrix} \cdot \begin{bmatrix} i_u \\ i_v \\ i_w \end{bmatrix} + \begin{bmatrix} e_u \\ e_v \\ e_w \end{bmatrix} \quad \text{(Expression 1)}$$

The voltage sources eu, ev and ew denote induced voltages, which are generated when an armature interlinkage flux crosses the currents flowing to the armature windings, and are expressed by a following expression.

$$\begin{bmatrix} e_u \\ e_v \\ e_w \end{bmatrix} = \begin{bmatrix} -\omega_e \Phi_a \sin\theta \\ -\omega_e \Phi_a \sin(\theta - 2\pi/3) \\ -\omega_e \Phi_a \sin(\theta - 4\pi/3) \end{bmatrix} \quad \text{(Expression 2)}$$

Where, $\Phi a$ denotes the maximum value of the armature winding flux linkage, and $\omega e$ denotes an electrical angle speed of the AC motor.

FIG. 4 shows a relation between the motor rotation speed and the induced voltage. In FIG. 4, the vertical axis indicates the induced voltage E, and the horizontal axis indicates the motor rotation speed N. As is apparent from FIG. 4, the induced voltage E has a characteristic proportional to the motor rotation speed N, and is designed so that the ratio of the induced voltage to the rotation speed is high for the hybrid vehicle. As voltage levels to be noted in the power control, there are enumerated (1) the upper limit of an inverter controllable voltage, and (2) the withstand voltage of the electric power supply passage.

When consideration is given to a case where the motor rotation speed is changed from zero to a high-speed region, with respect to the output voltage (that is, applied voltage to the armature winding terminal) of the three-phase inverter 15 at the time of normal control and at the time when the motor rotation speed is zero, both the induced voltage and the voltage by the armature reaction magnetic flux are zero, and there is only a component of a voltage drop by the armature resistance Ra. When the motor rotation speed is increased, since the induced voltage and the voltage by the armature reaction magnetic flux are increased, the output voltage of the three-phase inverter 15 is also increased.

However, unless the output voltage of the three-phase inverter 15 is kept to be not higher than the upper limit value of the inverter controllable voltage determined by the output voltage of the DC power supply 3, the control of the AC motor 2 breaks down and the control becomes impossible. Thus, when a deviation between the output voltage of the three-phase inverter 15 and the upper limit value of the controllable voltage becomes small, the flux-weakening control is performed so that the output voltage of the three-phase inverter 15 becomes a specified value or less.

When it is assumed that the flux-weakening control normally functions, even if the rotation speed is further increased, the control can be normally continued. However, since the induced voltage is increased in proportion to the motor rotation speed, there is a possibility that it exceeds the withstand voltage of the electric power supply passage. For example, in FIG. 4, at the time when the flux-weakening control F normally functions, and the AC motor 2 is operated at an operation point (A) not higher than the inverter controllable voltage upper limit value E1, in case the gate interruption state occurs in which the protection operation is operated by some abnormality, and the switching signals to the power elements UH, UL, VH, VL, WH and WL are interrupted, or the state occurs in which the stop of the switching signal is kept, the flux-weakening control F is released, a transition to an operation point (B) occurs, and the voltage almost equal to the induced voltage is applied to the electric power supply passage.

In this case, since the induced voltage of the AC motor 2 exceeds the withstand voltage E2 of the electric power supply passage, there occurs a possibility that a secondary fault, such as smoking, burnout or dielectric breakdown, occurs in a component part of the electric power supply passage. Accordingly, it is desirable to quickly shift to an operation point within a rotation speed range lower than an operation point (C) where the induced voltage becomes the withstand voltage E2 of the electric power supply passage or lower.

Next, a description will be given to a case where a power element as a component part of the electric power supply passage to the AC motor 2 is subjected to a short circuit fault, the abnormality due to the short circuit fault is detected, and there occur, as protection operations, a gate interruption state in which a switching signal is interrupted and a state in which nonconduction of the power element is kept.

When it is assumed that the transistor 18b of the power element UL is subjected to the short circuit fault, the abnormality due to the short circuit fault is detected, and switching signals to the respective power elements UH to WL are interrupted, and the power elements UH, VH, VL, WH and WL except the power element UL are put in the nonconducting state.

The circuit state of the electric power supply passage at this time becomes as shown in FIG. 3. That is, the transistors 18a, 18c, 18d, 18e and 18f except the transistor 18b are in the nonconducting (OFF) state, and only the flywheel diodes 19a, 19b, 19c, 19d, 19e and 19f become effective as the current passage. Besides, since the power element UL is subjected to the short circuit fault, the U-phase terminal voltage of the AC motor 2 always becomes equal to the potential of the DC power supply 3 at the low potential N side. As a result, the inner circuit of the three-phase inverter 15 and the AC motor 2 can be expressed as shown in FIG. 5A.

Figure 5A:
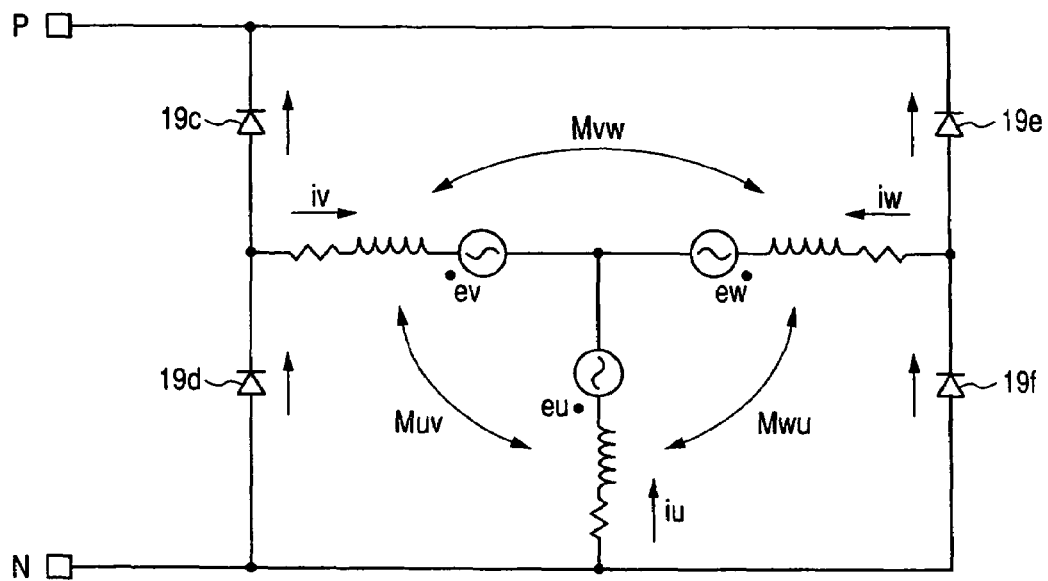
FIGS. 5A and 5B are explanatory views showing circuit states of an inverter and a motor at the time of occurrence of a short circuit fault in the vehicular power control apparatus according to embodiment 1 of the invention.

In the circuit state of FIG. 5A, since the potential of the U-phase terminal becomes the low potential N of the DC power supply 3, the potential at the neutral point c of the armature winding of the AC motor 2 is expressed by, relative to the low potential N of the DC power supply 3, a potential difference appearing at both ends of the U-phase armature winding having, as circuit elements, the armature resistance Ra, the self inductance La, the mutual inductances Muv and Mwu, and the induced voltage eu. As compared with the case of the three-phase balance state, the potential is changed very largely. On the other hand, the V-phase terminal voltage becomes, relative to the potential at the neutral point c, a potential obtained by adding a potential difference appearing at both ends of the V-phase armature winding to this potential. Similarly, the W-phase terminal voltage is expressed by, relative to the potential at the neutral point c, a potential obtained by adding a potential difference appearing at both ends of the W-phase armature winding to this potential.

Besides, when the V-phase terminal voltage is higher than the high potential P of the DC power supply 3, the flywheel diode 19c of the power element VH is forwardly biased to become conductive, and when the V-phase terminal voltage is lower than the low potential N of the DC power supply 3, the flywheel diode 19d of the power element VL is forwardly biased to become conductive. Similarly, when the W-phase terminal voltage is higher than the high potential P of the DC power supply 3, the flywheel diode 19e of the power element WH is forwardly biased to become conductive, and when the W-phase terminal voltage is lower than the low potential N of the DC power supply 3, the flywheel diode 19f of the power element WL is forwardly biased to become conductive.

Incidentally, although the description has been given to the case where the short circuit fault occurs in the transistor 18b of the power element UL, the same applies to a case where the short circuit fault occurs in the flywheel diode 19b.

Figure 5B:
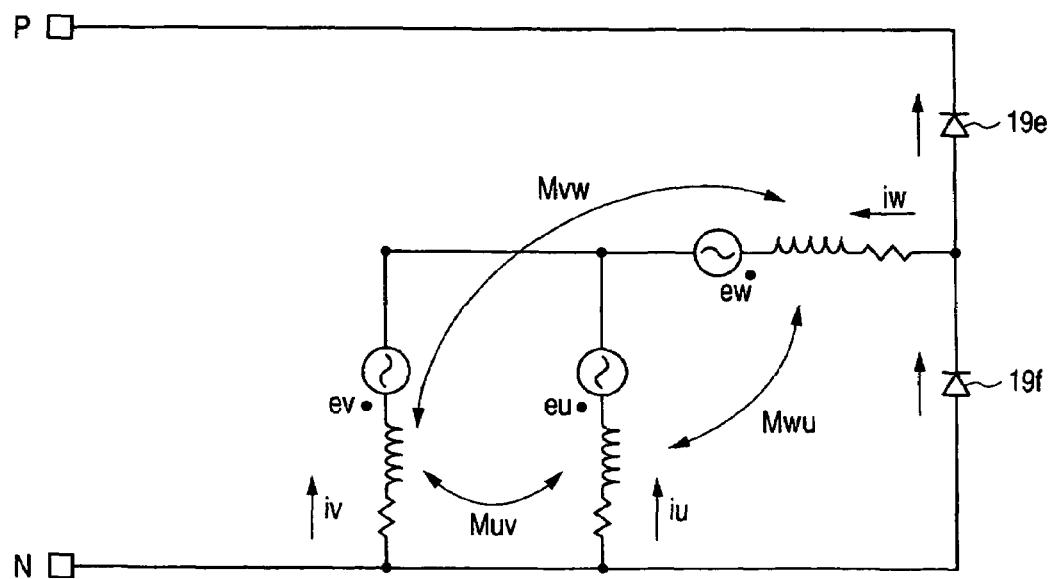

Besides, when the power element UL and the power element VL are subjected to the short circuit fault, the inner circuit of the three-phase inverter 15 and the AC motor 2 can be expressed as shown in FIG. 5B. In this case, only the flywheel diodes 19e and 19f of the respective power elements WH and WL become effective as the current passage.

As a result, the U-phase terminal potential and the V-phase terminal potential of the AC motor 2 become always equal to the potential of the DC power supply 3 at the low potential N side. As stated above, since the U-phase terminal potential and the V-phase terminal potential become the low potential N of the DC power supply 3, the potential at the neutral point c of the armature winding of the AC motor 2 is expressed by, relative to the low potential N, the potential difference appearing at both ends of the U-phase armature winding and the V-phase armature winding. The W-phase terminal voltage is expressed by, relative to the neutral point potential c, a value obtained by adding the potential difference appearing at both ends of the W-phase armature winding.

In this circuit state, when the W-phase terminal voltage is higher than the high potential P of the DC power supply 3, the flywheel diode 19e of the power element WH is forwardly biased to become conductive, and when the W-phase terminal voltage is lower than the low potential N of the DC power supply 3, the flywheel diode 19f of the power element WL is forwardly biased to become conductive.

As stated above, in the normal state, by the balance of the three phases of the AC motor 2, the potential at the neutral point c becomes the intermediate potential between the high potential P side potential of the DC power supply 3 and the low potential N side potential in average. On the other hand, when the balance of the three phases is lost due to the short circuit fault of the power element, the potential as mentioned before appears. Thus, the terminal voltage of the AC motor 2 is brought into the phase nonequilibrium state, and abnormal current flows through the electric power supply passage of the electric power converter 1 and the AC motor 2.

FIGS. 6A to 6D show motor currents in the respective cases described above. In these drawings, the vertical axis indicates the motor current, and the horizontal axis indicates the time.

FIG. 6A shows the motor currents in the case where all the power elements UH to WL have no short circuit fault and are normal, switching signals to the respective power elements are interrupted to cause the gate interruption state, and the nonconducting (OFF) state is kept. In this case, in the respective power elements UH to WL, only the flywheel diodes 19a to 19f become effective as the current path, and the three-phase inverter 15 functions as a diode bridge to full-wave rectify a three-phase alternating current into a direct current, and accordingly, current waveforms similar to each other in the three phases appear as shown in the drawing.

FIG. 6B shows the waveforms of the motor currents in the case where from the state of FIG. 6A, the transistor 18b of the power element UL is subjected to a short circuit fault. Although the motor currents of the respective phases in this case have amplitudes substantially equal to each other, the average value is not 0 [A] but is offset, and the width from the maximum value of the current to the maximum value is enlarged from the state of the full-wave rectification in the case of FIG. 6A. With respect to the DC component as the average value of the current, the current of the U-phase in which the short circuit fault occurs is largely offset to the minus side, and the currents of the V phase and the W phase in which the short circuit fault does not occur are offset to the plus side. In either case, the amplitude of the current and the absolute value are increased, and an abnormal current exceeding the rating flows through the electric power supply passage, and accordingly, the secondary fault, such as smoking, burnout or dielectric breakdown, can occur.

FIG. 6C shows the waveform of the motor current flowing in the case where from the state of FIG. 6A, the transistor 18b of the power element UL and the transistor 18d of the power element VL are subjected to the short circuit fault. In this case, similarly to FIG. 6B, although the amplitudes of the motor currents of the respective phases are substantially equal to each other, the average value is not 0 [A] but is offset, and the width from the positive maximum value of the current to the negative maximum value also becomes larger than that of the case of the state of the full-wave rectification shown in FIG. 6A. With respect to the DC component as the average value of the current, the currents of the U-phase and the V-phase in which the short circuit fault occurs are offset to the minus side, and the current of the W-phase in which the short circuit fault does not occur is offset to the plus side. Although the amount of the offset to the minus side is decreased as compared with the case of FIG. 6B, since the amplitude of the current and the absolute value are increased and an abnormal current exceeding the rating flows, the secondary fault can occur after all.

FIG. 6D shows the waveforms of the motor currents flowing in the case where all phases of the lower arm of the three-phase inverter 15 are short-circuited, that is, the transistors 18b, 18d and 18f of the power elements UL, VL and WL are subjected to the short circuit fault. In this case, since all the terminal voltages of the respective phases of the AC motor 2 are equal to each other, and the balance of the three phases is established, although the amplitudes of the flowing currents are comparable to those of the cases shown in FIGS. 6B and 6C, the DC component as the average value of the current becomes zero and the stable current waveform is obtained.

As stated above, except the case where all phases of the arm of the three-phase inverter 15 are short-circuited, in the case where the short circuit fault occurs in some arm, the average value (DC component) of the motor current is offset, and the abnormal current exceeding the rating flows. At this time, in the case where the short circuit fault occurs in the lower arm connected to the low potential N side of the DC power supply 3, the average value of the current of the short circuit phase is offset to the minus side, and in the case where the short circuit fault occurs in the upper arm connected to the high potential P side of the DC power supply 3, the average value of the current of the short circuit phase is offset to the plus side. The average value of the current of the phase in which the short circuit fault does not occur is offset so that the sum total of the currents flowing in all the phases becomes 0 [A].

Incidentally, although a description is omitted, in the case where one phase of the upper arm and one phase of the lower arm are subjected to the short circuit fault, or even in the case where two phases of one of the upper and lower arms are subjected to the short circuit fault, and one phase of the other arm is subjected to the short circuit fault, the development can be made in the same method of thinking as the foregoing description.

From these, when an observation is made to the motor currents at the time when the power element constituting the three-phase inverter 15 in the electric power converter 1 keeps the nonconducting (OFF) state by the gate interruption, the occurrence of the short circuit fault of the power element can be detected, and it becomes possible to specify the part of the occurrence of the short circuit fault.

Next, a description will be given to a vehicular power control apparatus of embodiment 1 constructed based on the foregoing basic operation principle.

Figure 7:
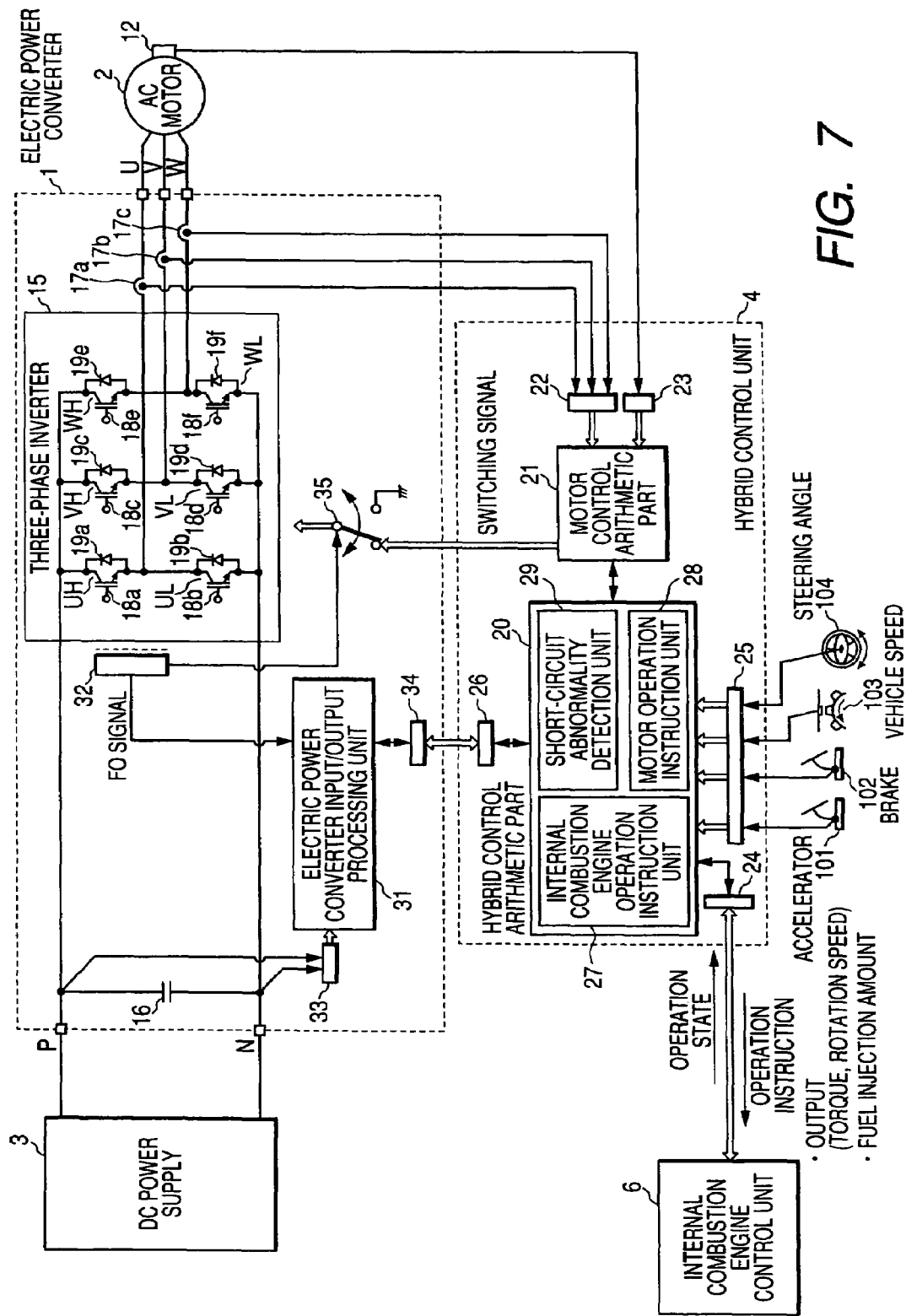
FIG. 7 is a block diagram showing a structure relating to the power control of the motor in the vehicular power control apparatus according to embodiment 1 of the invention.

FIG. 7 is a block diagram showing a structure relating to power control of an AC motor in the power control apparatus for the hybrid vehicle according to embodiment 1 of the invention. In the drawing, those denoted by the same reference symbols as FIGS. 1 to 6 represent the same or like portions.

In FIG. 7, operation information indicating an operation state of an internal combustion engine 5 (see FIG. 1) is inputted from an internal combustion engine control unit 6 to an internal combustion engine system operation information transmission unit 24 provided in a hybrid control unit 4. Besides, a vehicle operation information calculation unit 25 provided in the hybrid control unit 4 receives signals from a depression amount detector 101 to generate a signal corresponding to the depression amount of an accelerator pedal of the hybrid vehicle, a brake depression amount detector 102 to generate a signal corresponding to the depression amount of a brake pedal, a vehicle speed detector 103 to generate a signal corresponding to a vehicle speed, and a steering angle detector 104 to generate a signal corresponding to the steering angle of a steering wheel, and calculates operation information of the vehicle based on these signals.

A motor system operation information transmission unit 26 provided in the hybrid control unit 4 transmits/receives operation information of the AC motor 2 to/from an electric power converter information transmission unit 34 provided in an electric power converter 1. Besides, a short-circuit abnormality detection unit 29 provided in a hybrid control arithmetic part 20 detects, based on information from the motor system operation information transmission unit 26, an abnormality due to a short circuit fault in an electric power supply passage including power elements UH to WL of a three-phase inverter 15 and the like.

When the short-circuit abnormality detection unit 29 detects the abnormality due to the short-circuit accident of the electric power supply passage, an internal combustion engine operation instruction unit 27 provided in the hybrid control arithmetic part 20 gives an operation instruction corresponding to the detected abnormality to the internal combustion engine control unit 6 as described later. Similarly, when the short-circuit abnormality detection unit 29 detects the abnormality due to the short-circuit accident of the electric power supply passage, a motor operation instruction unit 28 provided in the hybrid control arithmetic part 20 gives an operation instruction corresponding to the detected abnormality to a motor control arithmetic part 21 as described later. A DC link voltage calculator 33 including resistive voltage-dividing circuits and the like is connected to both ends of a smoothing capacitor 16, and calculates a voltage signal between both the ends of the smoothing capacitor 16 as a DC link voltage value.

In the case where an abnormality occurs in a power supply passage from a DC power supply 3 to an AC motor 2 through the electric power converter 1, a protection operation control part 32 detects this, operates a gate signal interruption switch 35 to interrupt the switching signal from the motor control arithmetic part 21, places the power elements UH to WL into a gate interruption state, and operates so as to protect these. The protection operation by the interruption of the switching signal is continuously performed for a specified period of about 10 [ms], and after the specified period is ended, the interruption of the switching signal is stopped, and the protection operation is released. Besides, the protection operation control part 32 is constructed to notify an electric power converter input/output processing unit 31 by a protection operation identifying signal (FO: Fault Output) that the protection operation is being performed.

The other structure is similar to the structure shown in FIG. 2.

Next, the operation of the vehicular power control apparatus according to embodiment 1 will be described.

In the state where the power control of the hybrid vehicle is normally performed, the hybrid control unit 4 receives information relating to the operation state of the internal combustion engine 5 from the internal combustion engine control unit 6 through the internal combustion engine system operation information transmission unit 24, and gives an operation instruction concerning the internal combustion engine 5 to the internal combustion engine control unit 6 through the internal combustion engine system operation information transmission unit 24 to perform the power control of the internal combustion engine 5.

Besides, the hybrid control unit 4 receives operation information relating to the AC motor 2 and the electric power converter 1 from the electric power converter 1 through the motor system operation information transmission unit 26, and further receives information relating to the motor current and the rotation angle and rotation speed of the AC motor 2 through a motor current calculation unit 22 and a rotation angle speed calculation unit 23. Besides, the hybrid control unit 4 outputs switching signals to switching-control respective transistors 18*a* to 18*f* of the power elements UH to WL in the three-phase inverter 15 to the electric power converter 1 and performs the output control of the AC motor 2.

As the information which the hybrid control unit 4 receives from the DC link voltage calculator 33 through the motor system operation information transmission unit 26, there is the DC link voltage corresponding to the inter-terminal voltage of the smoothing capacitor 16 or the like. The information relating to the DC link voltage or the like is information-transmitted to the hybrid control unit 4, and then is used for the motor control arithmetical operation in the motor control arithmetic part 21. Incidentally, as information transmission between these devices, serial communication typified by CAN (Controller Area Network), UART (Universal Asynchronous Receiver and Transmitter) or LIN (Local Interconnect Network), or a communication system using modulation of analog voltage is used.

Here, in the case where an abnormality occurs in the electric power supply passage from the DC power supply 3 to the AC motor 2 through the electric power converter 1, the protection operation control part 32 in the electric power converter 1 detects this, switches the gate signal interruption switch 35 in the electric power converter 1 to interrupt the gate signal, and invalidates the switching signal from the hybrid control unit 4 to cause the transistors 18*a* to 18*f* of the power elements UH to WL to be nonconductive (OFF). Next, the protection operation control part 32 notifies the electric power converter input/output processing unit 31 by the protection operation identifying signal FO that the protection operation is being performed.

The electric power converter input/output processing unit 31 having received the protection operation identifying signal FO transmits information and notifies the hybrid control unit 4 through the electric power converter information transmission unit 34 that the electric power converter 1 is performing the protection operation. Specifically, the electric power converter input/output processing unit 31 encodes (coding) the information indicating that the protection operation control part 32 is performing the protection operation, and controls the output signal line of communication in accordance with a specified communication protocol. In the hybrid control unit 4, the motor operation information transmission unit 26 decodes (decoding) the data received in accordance with the specified protocol, and notifies the hybrid control arithmetic part 20 that the protection operation is being performed.

The motor operation instruction unit 28 provided in the hybrid control arithmetic part 20 recognizes, based on the notification from the motor system operation information transmission unit 26, that the electric power converter 1 is performing the protection operation, stops the generation of the switching signal in accordance with the normal motor control arithmetical operation, and gives an instruction to the motor control arithmetic part 21 so as to keep the transistors 18*a* to 18*f* in the three-phase inverter 15 to be in the nonconducting (OFF) operation state. Based on this instruction, the motor control arithmetic part 21 outputs the switching signal so that the transistors 18*a* to 18*f* are brought into the nonconducting (OFF) operation, and keeps this.

In the electric power converter 1, the switching signal is set by the motor control arithmetic part 21 so that the transistors 18a to 18f perform nonconducting operations even if the protection operation control part 32 releases the gate interruption operation of a specified period, and validates the switching signal from the hybrid control unit 4 by switching the gate signal interruption switch 35 to the side where the switching signal is made to pass through. Thus, similarly to the period when the gate interruption operation is being performed, the transistor 18 remains instructed to perform the nonconducting operation.

Here, the short-circuit abnormality detection unit 29 in the hybrid control arithmetic part 20 performs the detection operation of the presence/absence of the abnormality due to the short circuit fault of the electric power supply passage. The detection of the presence/absence of the abnormality is performed by detecting the motor current amount exceeding the rating by the nonequilibrium of the phase current due to the short circuit fault described before. Thus, the motor control arithmetic part 21 notifies the short-circuit abnormality detection unit 29 of the motor current value detected by the current detectors 17a to 17c and obtained by the motor current calculation unit 22.

Figure 8:
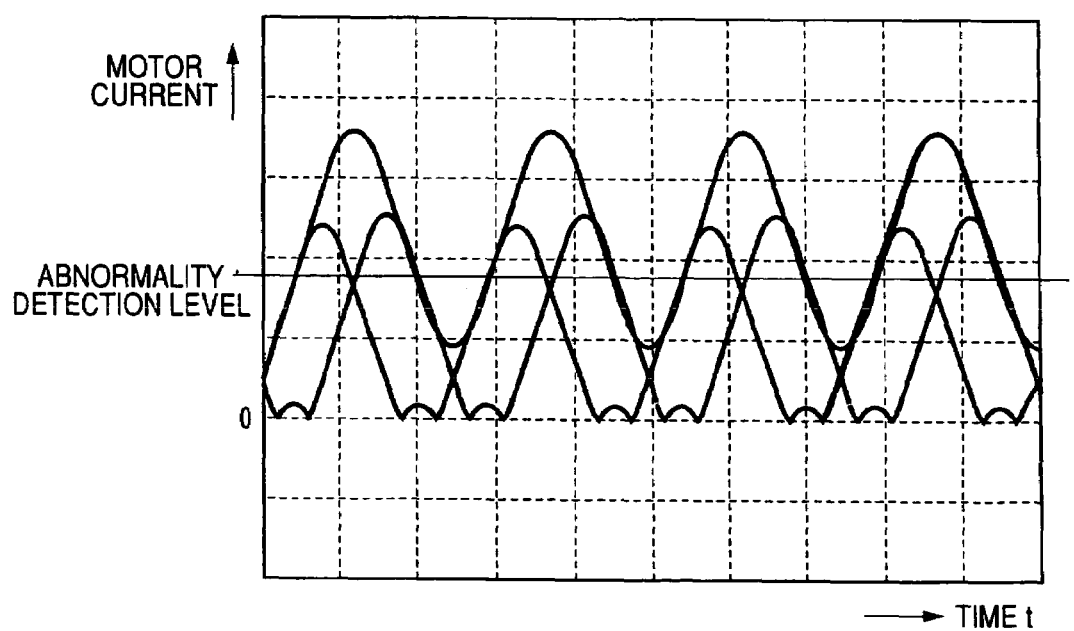
FIG. 8 is a waveform view for explaining a detection method of a short-circuit abnormality in the vehicular power control apparatus according to embodiment 1 of the invention.

The short-circuit abnormality detection unit 29 judges whether or not the absolute amount of the motor current value notified from the motor current calculation unit 22 exceeds the specified threshold and detects the abnormality. This will be described with reference to FIG. 8. FIG. 8 shows waveforms indicating the absolute amounts of motor current values in the case where the power element UL shown in FIG. 6B is subjected to a short circuit fault. As shown in FIG. 8, an abnormality detection level as a threshold is determined, and by judging whether or not the absolute amount of the motor current value exceeds the abnormality detection level, the conduction of an abnormal current exceeding the rating due to the occurrence of the short circuit fault can be easily detected. The short-circuit abnormality detection unit 29 detects the abnormality due to the short circuit fault of the electric power supply passage based on whether the absolute amount of the motor current value exceeds the abnormality detection level.

As another method of detecting the abnormality due to the short circuit fault by using the motor current, it is also conceivable to detect the abnormality by averaging current values of the respective phases and grasping a phenomenon in which the value exceeds a specified threshold and is offset. Besides, when the waveform of the motor current is observed in detail, it becomes possible to specify the occurrence part of the short circuit fault. Thus, in accordance with the specified occurrence part of the short circuit fault, the gate interruption of the transistor of the phase in which the short circuit fault does not occur, and the maintenance of the nonconducting state are released, and as long as the high potential P side arm in each phase and the low potential N side arm are not brought into the short-circuit state, the transistor is placed in the conducting state so that the motor terminal of the high potential P side arm including the phase of the short circuit fault or the motor terminal of the low potential N side arm is short-circuited to cause the three-phase short-circuit state, and the countermeasure to return the DC component as the average value of the motor current to zero can also be performed.

Next, the short-circuit abnormality detection unit 29 divides the degree of urgency for avoiding the secondary fault into stages and sets them according to the magnitude of the motor current, the structure of the short circuit fault occurrence part, the arrangement feature, such as whether the short circuit fault occurrence part is close to a combustible material, such as an oil passage or a fuel passage, a brake, a steering mechanism or the like, or the material feature such as a part made of a material having low firing point or a part made of a material in which a smoking range is likely to expand.

For that purpose, in the short-circuit abnormality detection unit 29, evaluation points to give weighting of importance to the structure and arrangement feature and the material feature are tabulated and are stored in a memory. The evaluation point at the time of the occurrence of a short circuit fault is calculated by referring to the table, and the sum total of the evaluation points is made to correspond to the degree of urgency. Since the possibility of the occurrence of the secondary fault, such as smoking, burnout or dielectric breakdown, is due to heat generation by the conduction of a large current, the corresponding operation to the degree of urgency can be performed with respect to the square value of the motor current. Incidentally, the degree of urgency is calculated based on the possibility that an important secondary fault occurs, and becomes a standard indicating how quickly the occurrence of the secondary fault should be avoided.

Besides, as the information of the vehicle operation, respective pieces of information, such as the degree of driver's request for acceleration, the degree of request for declaration, vehicle speed, and steering amount are inputted to the hybrid control arithmetic part 20 through the vehicle operation information calculation unit 25. This is performed such that an accelerator pedal depression amount signal from the accelerator depression amount detector 101, a brake pedal depression amount signal from the brake depression detector 102, a vehicle speed signal from the vehicle speed detector 103, and a steering signal from the steering detector 104 are respectively inputted to the vehicle operation information calculation unit 25, these signals are converted or calculated into the degree of request for acceleration, the degree of request for declaration, the vehicle speed, and the steering amount, and are inputted to the hybrid control arithmetic part 20.

The hybrid control arithmetic part 20 receives the foregoing information of the vehicle operation, and causes the vehicle operation information to be reflected on the operation instruction of the internal combustion engine power control for avoiding the secondary fault due to the short circuit fault of the electric power supply passage. This is performed by the following reason. That is, in order to avoid the secondary fault, it is necessary to give the operation instruction so that the power as the output of the internal combustion engine falls within a specified range. However, in the case where the acceleration/declaration speed of the vehicle is large, since the state is such that the change of the operation point of the vehicle is large, it is appropriate that the change of the operation instruction of the internal combustion engine per unit time is set to be small.

Besides, in the case where the vehicle is rotating at high speed, when the power of the internal combustion engine is limited contrary to the intention of the driver, the behavior of the vehicle becomes unstable, and the danger rises. Thus, it is preferable to start the power limitation of the internal combustion engine after the rotation is ended. Besides, in the case where a short circuit fault occurs during high speed traveling of the vehicle, it is supposed that the damage due to the instantaneous high voltage application and the flowing of a large current is serious, and therefore, it is necessary to give the operation instruction of the internal combustion engine to quickly stop the vehicle. However, in the case where a short circuit fault occurs during traveling of the vehicle at middle speed or low speed, it is possible to select the permission of limp home running by giving the operation instruction to limit the power of the internal combustion engine within the range where heat generation of the electric power supply passage due to the flowing of a large current does not become large.

Next, the internal combustion engine operation instruction unit 27 outputs the operation instruction of the internal combustion engine based on an internal combustion engine output upper limit characteristic at the time of short-circuit abnormality, which is calculated from the correlation among the rotation speed of the AC motor, the motor current amount, and the rotation speed of the internal combustion engine. Here, the operation instruction of the internal combustion engine is performed by operating the parameter to adjust the power as the output of the internal combustion engine. As the parameter operation for power adjustment of the internal combustion engine, a conventional well-known control method of an internal combustion engine may be used. For example, there is a method of setting an operation stop cylinder, a method of decreasing an opening degree of a throttle valve to decrease an inflow air amount to a cylinder and to artificially produce a state equivalent to the decrease of an accelerator pedal depression amount, or a method of decreasing a fuel injection amount. Here, a description will be made based on the internal combustion engine power adjustment by the fuel injection amount.

In order to avoid the secondary fault, such as smoking, burnout or dielectric breakdown, due to the short circuit fault, the amount of current flowing to the motor must be suppressed to a permissible value or less. This permissible value is set in view of the cooling performance, firing temperature and the like at a part of heat generation in the electric power supply passage. Next, the current amount permissible value is converted into a corresponding induced voltage value, and is further converted into a corresponding motor rotation speed. The conversion from the current permissible value to the corresponding induced voltage is calculated from the characteristics of an electric circuit including a resistance component of a current passage of the electric power converter 1, a resistance component of a wiring of an electric power supply passage between the electric power converter 1 and the AC motor 2, armature resistance Ra in the AC motor 2, self inductance La, mutual inductances Muv, Mvw and Mwu, and induced voltages eu, ev and ew.

Figure 9A:
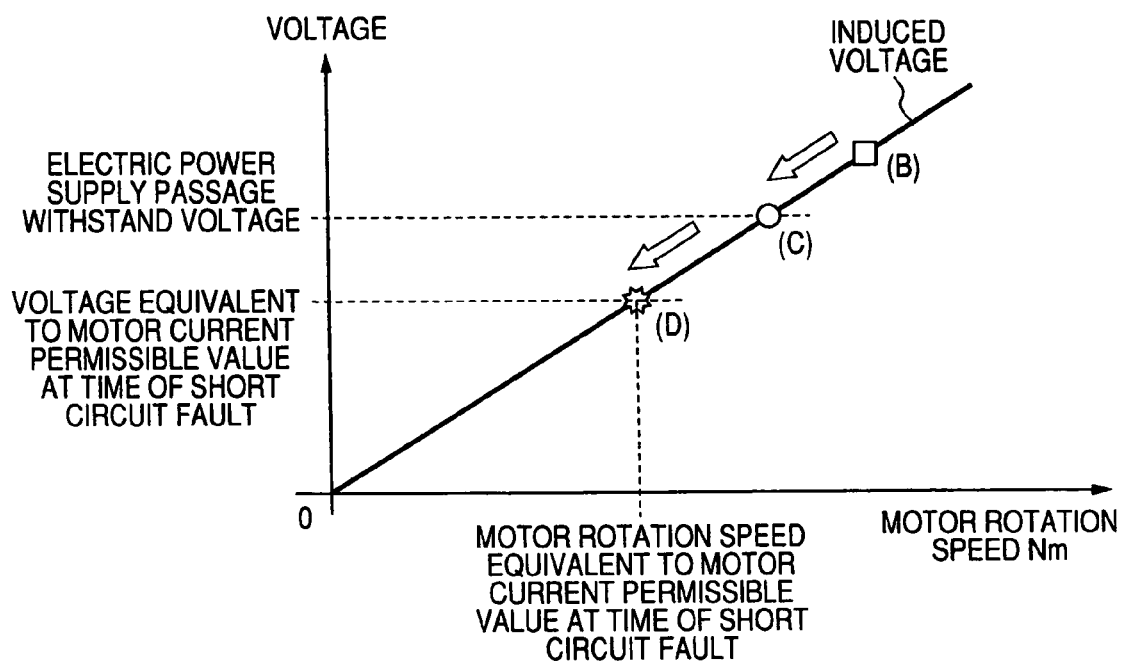
FIGS. 9A and 9B are explanatory views for explaining a relation between the rotation speed of an internal combustion engine and the rotation speed of a motor in the vehicular power control apparatus according to embodiment 1 of the invention.

The conversion from the permissible induced voltage to the permissible motor rotation speed is performed by the foregoing expression 2. This conversion is shown in FIG. 9A. That is, in FIG. 9A, when the short circuit fault occurs in the power element in the electric power supply passage, in the case where the operation point of the induced voltage generated in the armature winding of the AC motor 2 becomes point (B), since the induced voltage exceeds the withstand voltage of the electric power supply passage, it is necessary to quickly shift the operation point of the induced voltage to point (C). Besides, even if the operation point of the induced voltage is point (C), since it exceeds the voltage equivalent to the motor current permissible value at the time of the short circuit fault, the operation point must be successively shifted to point (D). The motor rotation speed at point (D) becomes the upper limit rotation speed to avoid the secondary fault.

Figure 9B:
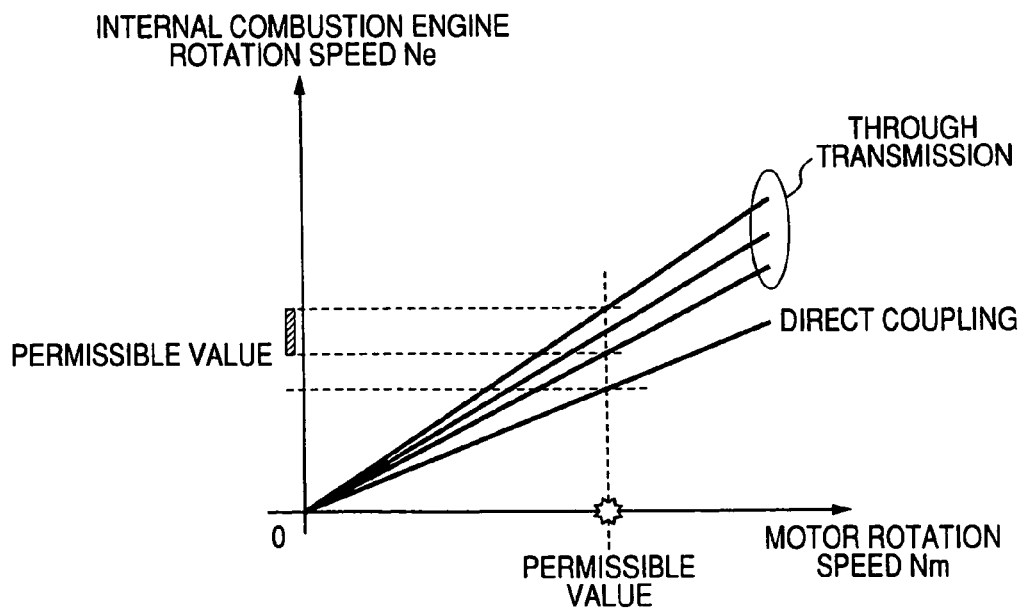

In order to shift the motor rotation speed to the permissible value indicated at point (D), the power of the internal combustion engine 5 is limited to lower the rotation speed of the internal combustion engine 5. FIG. 9B shows a relation between the rotation speed Nm of the AC motor 2 and the rotation speed Ne of the internal combustion engine 5.

That is, in FIG. 9B, in the case where the AC motor 2 and the output shaft of the internal combustion engine 5 are directly coupled to each other at a specified speed reduction ratio, the ratio of the rotation speed of the AC motor 2 to the internal combustion engine 5 is fixed, and accordingly, the permissible value of the rotation speed of the internal combustion engine 5 corresponding to the permissible value of the rotation speed of the AC motor 2 is determined only by the relation indicated by one solid line. Besides, in the case where a transmission intervenes between the AC motor 2 and the output shaft of the internal combustion engine 5, since the ratio of the rotation speeds is changed by the transmission gear ratio of the transmission, the permissible value of the rotation speed of the internal combustion engine 5 corresponding to the permissible value of the rotation speed of the AC motor 2 has a width corresponding to a speed change range as indicated by plural solid lines.

Based on the above relation, the internal combustion engine operation instruction unit 27 gives the operation instruction to the internal combustion engine control unit 6 to limit the power of the internal combustion engine so that the rotation speed of the internal combustion engine at the time of the occurrence of the short circuit fault becomes the permissible value or less. As the operation instruction at this time, specifically, the instruction of the fuel injection amount to the internal combustion engine control unit 6 is performed.

Figure 10:
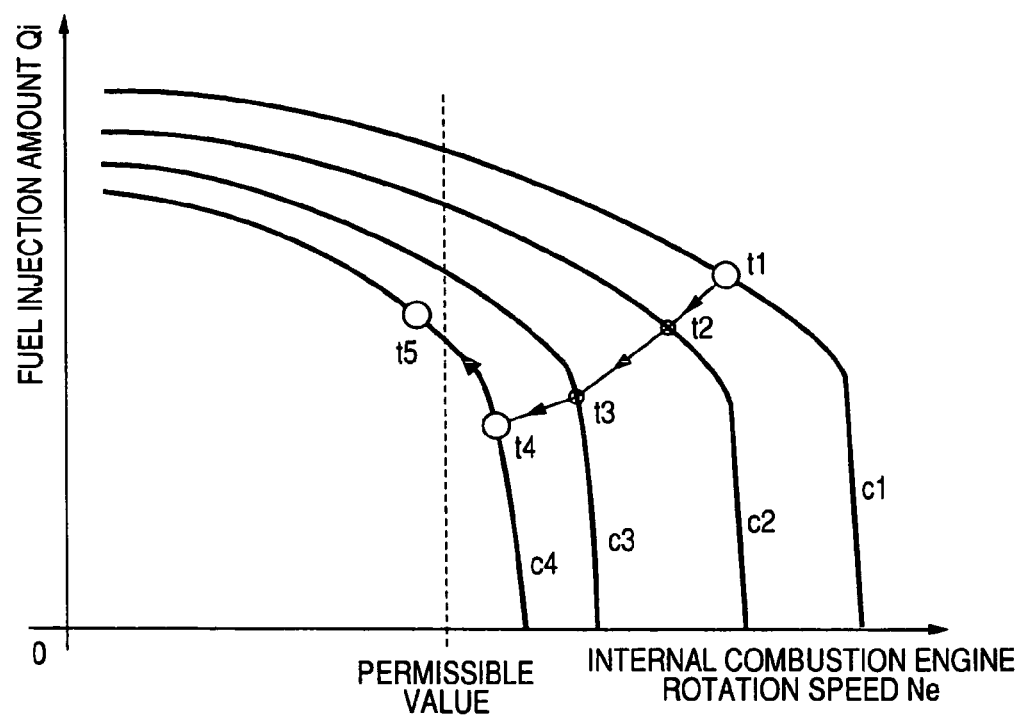
FIG. 10 is an explanatory view relating to an operation instruction of the internal combustion engine in the vehicular power control apparatus according to embodiment 1 of the invention.

This will be described with reference to FIG. 10. FIG. 10 shows characteristic lines of the fuel injection amount Qi to the internal combustion engine rotation speed Ne and the temporal transition of the operation point at the time when the power amount of the internal combustion engine is suppressed and the rotation speed of the internal combustion engine 5 is lowered since the short circuit fault occurs in the electric power supply passage at the time when the internal combustion engine operation instruction unit 27 gives instruction of the specified power amount to the internal combustion engine control unit 6.

In FIG. 10, in the case where the short circuit fault does not occur in the electric power supply passage and the normal power control is performed, the fuel injection amount Qi with respect to the internal combustion engine rotation speed Ne at the present time point is determined by a characteristic line c1. When the short circuit fault occurs at an operation point t1, the internal combustion engine operation instruction unit 27 changes the characteristic line to C2, C3 and C4, and gives instruction of the fuel injection amount to the internal combustion engine control unit 6 in accordance with the change of the operation points t2, t3 and t4.

In the case where the operation instruction is performed so that the vehicle travels at such a speed that the vehicle can stop anytime, transition of characteristic line is stopped at c4, and the operation point is settled to t5 finally. At the operation point t5, the internal combustion engine rotation speed Ne becomes not larger than a permissible value for avoiding the secondary fault at the time of short-circuit abnormality, and becomes such a rotation speed that traveling can be stopped anytime. Besides, in the case where it is judged based on the operation state that the vehicle should be stopped, the characteristic line to suppress the output is further traced, and finally, the rotation is held at the idle rotation speed or the internal combustion engine is stopped.

The change speed at which the characteristic lines c2, c3 and c4 are changed in view of the degree of urgency to the abnormality degree from the short-circuit abnormality detection unit 29 and the operation point change degree calculated from the operation state of the vehicle. That is, when the degree of urgency is high, setting is made to make a quicker change, and in the case where the acceleration/declaration speed of the vehicle is high, setting is made to make a more moderate change. Besides, when the vehicle is rotating, the shift of the characteristic line is suspended until the rotation is stopped.

The instruction of the fuel injection amount from the internal combustion engine operation instruction unit 27 is performed by the information transmission to the internal combustion engine control unit 6 through the internal combustion engine system operation information transmission unit 24. Specifically, the fuel injection amount instruction value is encoded (coding), and is transmitted by controlling the output signal line of the communication in accordance with a specified communication protocol.

The internal combustion engine control unit 6 performs power control of the internal combustion engine 5 in accordance with the instruction of the fuel injection amount. Thus, the rotation speed of the internal combustion engine 5 is lowered to the rotation speed permissible value to avoid the occurrence of the secondary fault.

By the operation described above, the power control system apparatus for the hybrid vehicle according to embodiment 1 of the invention detects the abnormality due to the occurrence of the short circuit fault of the electric power supply passage, and lowers the rotation speed of the internal combustion engine 5 to decrease the induced voltage of the AC motor 2 in accordance with the degree of the abnormality and the operation state of the vehicle so that the occurrence of the secondary fault, such as smoking, burnout or dielectric breakdown, is prevented, and operates to avoid the conduction of a large current due to the occurrence of the short-circuit trouble.

According to embodiment 1 of the invention, there is a merit that without changing the hardware elements constituting a conventionally used power control system apparatus for a hybrid vehicle, the occurrence of the secondary fault, such as smoking, burnout or dielectric breakdown, can be prevented at low cost and by only changing software elements. Besides, as the power element, it is preferable to apply a DLB (Direct lead Bonding) type one, since there does not occur separation of a bonding part feared in the case where the power element of the wire bonding system is used and there is no occurrence of an arc due to indefinite contact of a cut portion of a wire body, and the possibility that smoking or burnout occurs is reduced.

Incidentally, the operation and structural elements described in embodiment 1 are merely examples for realizing the invention, and the invention may be realized by a different operation and structural elements within the scope of the invention. That is, the AC motor 2 and the electric power converter 1 are not limited to three phases, and the transistor may not be the IGBT but may be a MOS-FET. Besides, the powers of the AC motor and the internal combustion engine are not limited to a system in which they are coupled by gears and the transmission, and a driving wheel is driven through a single drive shaft, and a system may be adopted in which they are coupled through a belt or a chain, or the internal combustion engine and the AC motor drive different driving wheels.

Besides, in embodiment 1, although the description has not been given to the operation of avoiding the occurrence of the secondary fault after the part of the occurrence of the short circuit fault is specified, the avoiding operation may be performed after the part of the occurrence of the short circuit fault is specified in detail. The method of the calculation and reflection of the degree of the abnormality due to the short circuit fault may be a different calculation method and a different reflection method based on different information, and the same applies to the calculation and reflection method of the state of the vehicle operation. Besides, when there is no disadvantage in a system operation, the calculation of the degree of abnormality, the reflection to the internal combustion engine operation instruction, the calculation of the vehicle operation state, and the reflection to the internal combustion engine operation instruction may be omitted.

Further, in embodiment 1, although the description has been made based on the structure in which the one AC motor and the one inverter are provided, and the power of the one AC motor is used, the invention can be applied to a case where two or more AC motors and inverters are provided, and powers of the plural AC motors are used. In this case, the structure is made such that each of the motors and an inverter of a corresponding power conversion circuit are combined to form one electric power supply passage, and an abnormality due to the occurrence of a short circuit fault is detected in each of such combinations, and the power control of the internal combustion engine is performed to avoid a secondary fault when an abnormality is detected in one of the electric power supply passages.

Embodiment 2

Hereinafter, a vehicular power control apparatus of embodiment 2 of the invention will be described.

Figure 11:
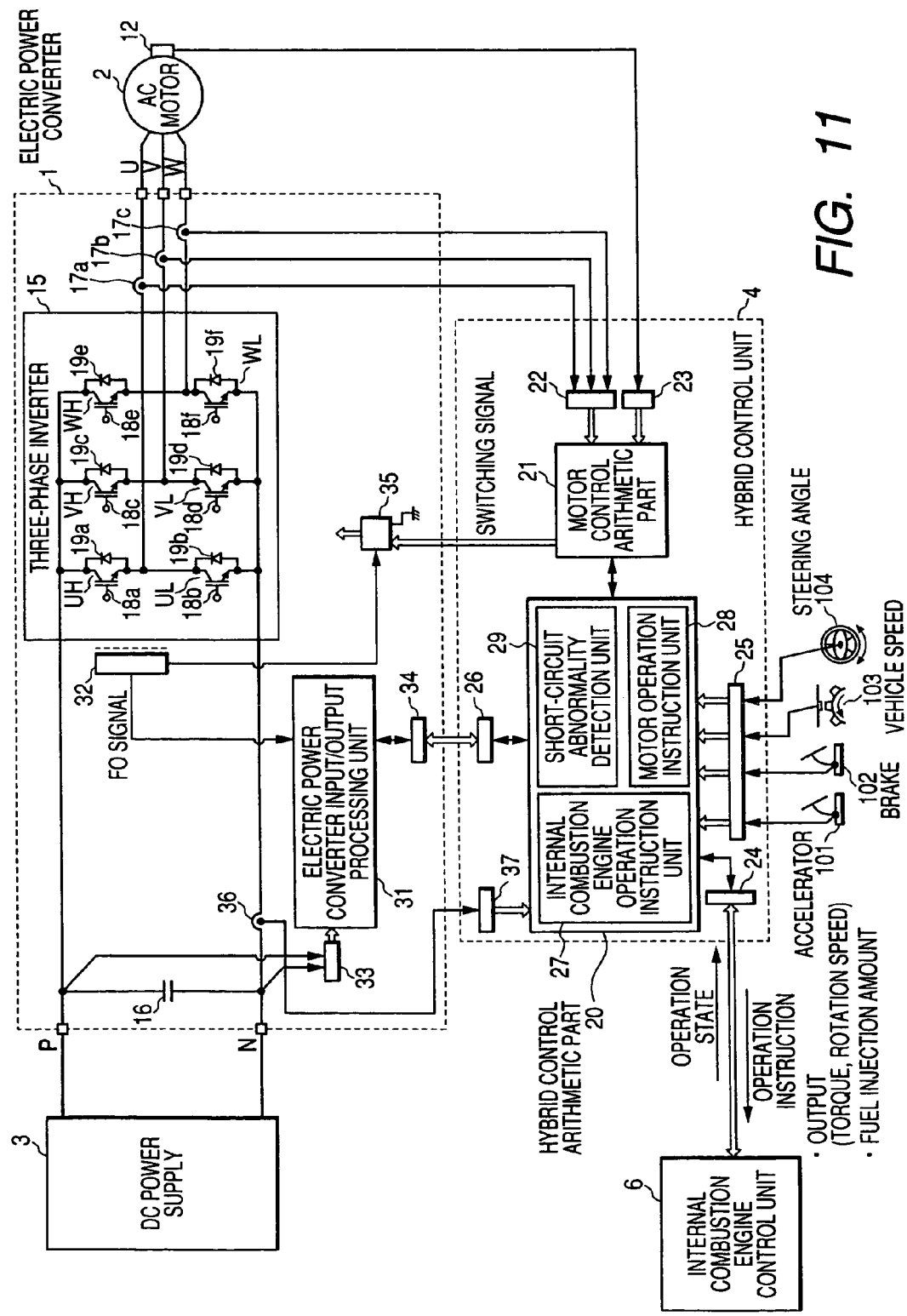
FIG. 11 is a block diagram showing a structure relating to power control of a motor in a vehicular power control apparatus according to embodiment 2 of the invention.

FIG. 11 is a block diagram showing a structure relating to power control of an AC motor in the power control apparatus for the hybrid vehicle according to embodiment 2 of the invention. In FIG. 11, those denoted by the same reference symbols as FIG. 7 represent the same or like portions as those shown in FIG. 7.

The vehicular power control apparatus of embodiment 2 shown in FIG. 11 has the same structure as embodiment 1 of FIG. 7 except that a power supply current detector 36 is provided in an electric power converter 1, and a power supply current calculation unit 37 is provided in a hybrid control unit 4.

In embodiment 2, an abnormality due to the occurrence of a short circuit fault in an electric power supply passage is detected based on a power supply current flowing between the electric power converter 1 and a DC power supply 3. FIGS. 12A to 12D show power supply currents flowing between the DC power supply 3 and the electric power converter 1 in the case where a short circuit fault occurs in the electric power supply passage. In FIGS. 12A to 12D, the horizontal axis indicates a common time axis, and the figures show waveforms of the power supply currents corresponding to the cases where the motor currents shown in FIGS. 6A to 6D flow. Here, the polarity in which current flows to charge the DC power supply 3 is made positive.

FIG. 12A shows the waveform of the power supply current flowing in the case where all power elements UH to WL of a three-phase inverter 15 are gate-interrupted and are placed in states where nonconduction (OFF) is kept, and in the power elements, only flywheel diodes 19a to 19f become effective as current paths. As shown in FIG. 6A, the three-phase alternating current is full-wave rectified by the diode bridge of the flywheel diodes.

FIG. 12B shows the waveform of the motor current in the case where from the state of FIG. 12A, the transistor 18b of the power element UL of the arm (lower arm) of the three-phase inverter 15 at the low potential N side is subjected to a short circuit fault. In this case, the current flows to the DC power supply 3 in the case where the flywheel diodes 19c and 19e of the arm (upper arm) of the V phase and the W phase at the high potential H side except the U-phase arm where the short circuit fault occurs become forward-biased, and the motor currents of two phases (V phase and W phase) except the phase where the short circuit fault occurs flow in the minus direction. The current is normally 0 [A], and has a waveform in which it flows at a short period and in the positive direction twice per one rotation period of the rotator of the AC motor 2.

FIG. 12C shows the waveform of the power supply current flowing in the case where from the state of FIG. 12A, the lower arm transistors of two phases (U phase and V phase) are subjected to the short circuit fault. In this case, the current flows to the DC power supply 3 in the case where the flywheel diode 19e of the upper arm of one remaining W phase except the U-phase and V-phase lower arms where the short circuit fault occurs becomes forward-biased, and the motor current of the W-phase where the short circuit fault does not occur flows in the minus direction. The current is normally 0 [A], and has the waveform in which it flows at a short period in the positive direction once per one rotation period of the rotator of the AC motor 2.

FIG. 12D shows the waveform of the power supply current in the case where all phases of the lower arm of the three-phase inverter 15 are short-circuited. Since all the flywheel diodes 19a, 19c and 19e of the upper arm are reversely biased, the power supply current does not flow and remains 0 [A].

Besides, the waveforms of the power supply currents in the case where all of the power elements UH, VH and WH of the upper arm are subjected to the short circuit fault can be developed similarly to the case of the short circuit fault of the lower arm. That is, in the case where all phases of the upper arm are short-circuited, the power supply current does not flow and is 0 [A], and in the case where one phase of the upper arm is subjected to the short circuit fault, the power supply current is normally 0 [A], and has a waveform in which the power supply current flows at a short period in the positive direction twice per one rotation period of the rotator. In the case where two phases of the upper arm are subjected to the short circuit fault, the current is normally 0 [A], and has a waveform in which the power supply current flows at a short period in the positive direction once per one rotation period of the rotator.

A short-circuit abnormality detection unit 29 detects a short-circuit abnormality based on the characteristic of the power supply current as stated above. First, the power supply current flowing between the DC power supply 3 and the electric power converter 1 is detected by the power supply current detector 36, and a power supply current signal corresponding to the power supply current is inputted to the electric supply current calculation unit 37. The electric supply current calculation unit 37 calculates the value of the electric supply current from the electric supply current signal, and inputs it to the short-circuit abnormality detection unit 29 in a hybrid control arithmetic part 20. The short-circuit abnormality detection unit 29 monitors that the electric supply current crosses the threshold near 0 [A] over one rotation period and the relation of magnitude is switched, or a relation in which the electric supply current is smaller than the threshold near 0 [A] is continuously established, and detects the short-circuit fault.

Incidentally, in the case where the motor rotation speed is low and the induced voltage is small, since the terminal voltage of the AC motor 2 becomes smaller than the output voltage of the DC power supply 3, even in the normal case where the short circuit fault does not occur in the electric power supply passage, the electric supply current does not flow, and remains 0 [A] similarly to the case where all phases of the upper arm or the lower arm of the three-phase inverter 15 are short-circuited. However, since the motor current does not flow and the occurrence of a secondary fault is avoided, even if the abnormality due to the short circuit fault is erroneously detected, there is no trouble. It corresponds to the processing for avoiding the secondary fault that the rotation speed of the AC motor is decreased and the induced voltage is lowered.

Incidentally, as another detection method of the short-circuit abnormality using the electric supply current, it is conceivable that a judgment is made based on whether a value obtained by filtering the value of the electric supply current is large as compared with an expected electric supply current value obtained from the rotation speed of the AC motor 2 and the voltage of the DC power supply 3 and exceeds a specified threshold. That is, the induced voltage by the AC motor 2 is obtained from the rotation speed of the AC motor 2, and by this, from the terminal voltage of the AC motor 2 and the output voltage of the DC power supply 3, it is possible to expect how large the charge current flowing to the DC power supply is at the time of full-wave rectification by the diode bridge. Thus, when an actual electric supply current is different from this expected electric supply current value, it is possible to regard that an abnormality occurs. In this case, as an equivalence to filtering of the value of the electric supply current, when the installation place of the electric supply current detector 36 is on the DC bus between the smoothing capacitor 16 and the DC power supply 3, it is also possible to detect an abnormality of electric supply current due to the short circuit fault of the smoothing capacitor 16.

When the abnormality is detected by the short-circuit abnormality detection unit 29, subsequently, similarly to the operation in embodiment 1, in order to avoid the secondary fault such as smoking, burnout or dielectric breakdown, the internal combustion engine operation instruction unit 27 issues an instruction to the internal combustion engine control unit 6 in order to suppress the amount of current flowing to the AC motor 2 to a permissible value or less, and the internal combustion engine control unit 6 controls the power of the internal combustion engine 5 in accordance with this instruction.

Embodiment 3

Figure 13:
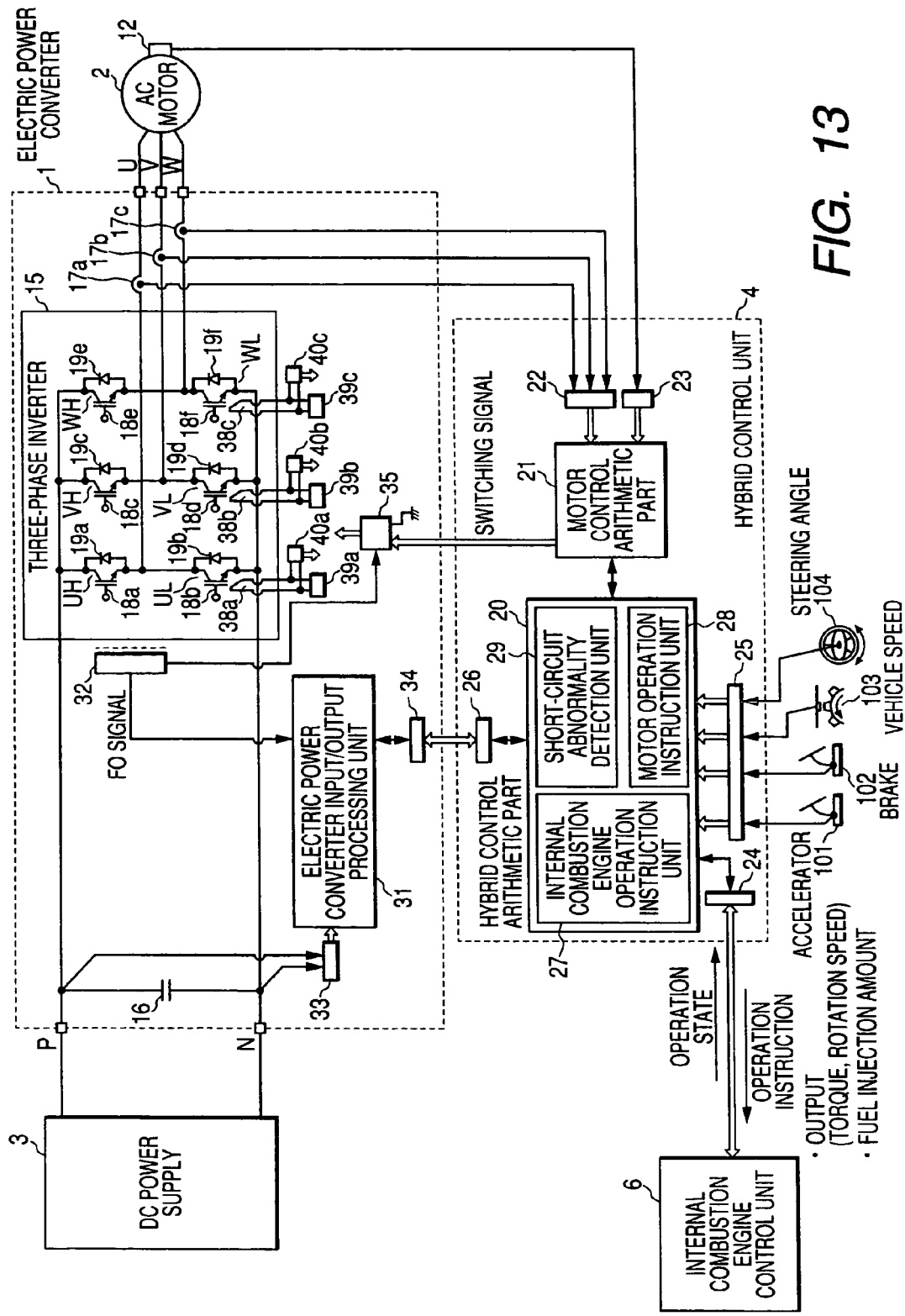
FIG. 13 is a block diagram showing a structure relating to power control of a motor in a vehicular power control apparatus according to embodiment 3 of the invention.

FIG. 13 is a block diagram showing a structure relating to power control of an AC motor in a power control apparatus for a hybrid vehicle according to embodiment 3 of the invention. In FIG. 13, those denoted by the same reference symbols as FIG. 7 represent the same or like portions as those shown in FIG. 7.

FIG. 13 shows the same structure as embodiment 1 shown in FIG. 7 except that thermal diodes 38a to 38c for detecting temperature of power elements UH to WL, constant current circuits 39a to 39c, and power element temperature calculation units 40a to 40c are provided in an electric power converter 1.

In embodiment 3, the detection of an abnormality due to the occurrence of a short circuit fault is performed by temperature change of the power elements UH to WL. In the case where the short circuit fault occurs in a power element on an electric power supply passage, as shown in FIGS. 6A, 6B and 6C, the abnormal current exceeding the rating flows to the electric power supply passage. Thus, the power element generates heat due to the loss in the resistance component of the power element of the electric power supply passage and its temperature rises.

Since the loss in the resistance component of the power element is proportional to the square of the amount of motor current, when the current amount becomes large, the heat generation is remarkably increased. Thus, in the case where the temperature of the power element exceeds a specified high temperature threshold, or in the case where the temperature exceeds a rated operation temperature determined by the balance between heat generation and cooling at the time of flowing of a rated current in a normal operation, and a temperature rise at a high change rate is expected, a judgment can be made that the short circuit fault occurs.

Thus, in embodiment 3, the detection of the short-circuit abnormality is performed by the following operation. As a detection mechanism of temperature of the power element, the thermal diodes 38a to 38c are installed in the vicinity of the power elements of the respective arms in a three-phase inverter 15. The constant current circuits 39a to 39c are connected to the thermal diodes 38a to 38c and specified currents are made to flow.

At this time, a forward voltage drop Vf of the pn junction part of each of the thermal diodes 38a to 38c is changed by the temperature of the pn junction part. Each of the power element temperature calculation units 40a to 40c receives the forward voltage drop Vf of the thermal diodes 38a to 38c, calculates the power element temperature by regarding the temperature of the pn junction part substantially as the temperature of the power elements UH to WL based on the relation between the temperature of the pn junction part of the thermal diodes 38a to 38c and the forward voltage drop Vf, and notifies an electric power converter input/output processing unit 31.

The electric power converter input/output processing unit 31 transmits information relating to the power element temperature to a hybrid control unit 4 through an electric power converter information transmission unit 34. A motor system operation information transmission unit 26 in the hybrid control unit 4 receives the information, and notifies a hybrid control arithmetic part 20 of the power element temperature.

In the hybrid control arithmetic part 20, a short-circuit abnormality detection unit 29 receives the power element temperature from the motor system operation information transmission unit 26, and detects a short-circuit abnormality based the relation among the occurrence of the short circuit fault, the conduction of the abnormal current exceeding the rating, heat generation due to this, and temperature rise. With respect to the degree of abnormality due to the short circuit, there is obtained the degree of abnormality due to the short-circuit trouble obtained based on the information relating to the temperature of the electric power supply passage and/or the information relating to the current flowing to the electric power supply passage. The information of the current used for obtaining the degree of abnormality is the information relating to the flow mode and/or current value of the current flowing to the AC motor 2 shown in FIGS. 6A to 6D, or the current flowing to the DC power supply 3 shown in FIGS. 12A to 12D.

When the abnormality is detected by the short-circuit abnormality detection unit 29, subsequently, similarly to the operation in embodiment 1, the power of the internal combustion engine is controlled so as to avoid the secondary fault such as smoking, burnout or dielectric breakdown.

Incidentally, in embodiment 3, although the description has been given to the detection of the power element temperature using the thermal diodes and the short-circuit abnormality detection by the power element temperature, the short-circuit abnormality may be detected by temperature detection using a method other than this. For example, a thermistor may be used as the temperature detection element, or the temperature on the electric power supply passage different from the power element is measured, and the short-circuit abnormality may be detected by this temperature. Besides, the judgment method of the short-circuit abnormality can also be suitably realized by a different algorithm other than that described above.

What is claimed is:

1. A vehicular power control apparatus for performing power control of a hybrid vehicle using output of an internal combustion engine and output of an AC motor as sources of power, comprising:
   an internal combustion engine control unit to control the output of the internal combustion engine;
   an electric power converter that is connected to the AC motor and a DC power supply to form, together therewith, an electric power supply passage, performs power conversion by a switching operation of a switching unit, and supplies electric power from one of the DC power supply and the AC motor to the other;
   a hybrid control unit that has a function to control the output of the AC motor by controlling the switching operation of the electric power converter and cooperates with the internal combustion engine control unit to perform an arithmetical operation for the power control of the hybrid vehicle;
   a short-circuit abnormality detection unit that is provided in the hybrid control unit and detects an abnormality due to a short circuit fault of the electric power supply passage; and
   an internal combustion engine operation instruction unit that is provided in the hybrid control unit and gives, when the short-circuit abnormality detection unit detects the abnormality, an instruction, which causes the internal combustion engine to perform an operation corresponding to the abnormality, to the internal combustion engine control unit.

2. The vehicular power control apparatus according to claim 1, wherein the short-circuit abnormality detection unit detects the abnormality due to the short circuit fault based on information relating to switching of the electric power converter and information relating to a current flowing to the AC motor.

3. The vehicular power control apparatus according to claim 1, wherein the short-circuit abnormality detection unit detects the abnormality due to the short circuit fault based on information relating to the amount of instruction of output control of the AC motor and information relating to a current flowing to the DC power supply.

4. The vehicular power control apparatus according to claim 1, further comprising a temperature detector to measure temperature of at least one of the switching unit of the electric power converter and the electric power supply passage,
   wherein the short-circuit abnormality detection unit detects the abnormality due to the short circuit fault based on information relating to the amount of instruction of output control of the AC motor, information relating to switching of the electric power converter, and information relating to the temperature detected by the temperature detector.

5. The vehicular power control apparatus according to claim 1, wherein the internal combustion engine operation instruction unit gives an operation instruction, which is adapted to a degree of the abnormality due to the short-circuit fault obtained based on at least one of information relating to temperature of the electric power supply passage and information relating to a current flowing to the electric power supply passage, to the internal combustion engine control unit.

6. The vehicular power control apparatus according to claim 5, wherein the information relating to the current is information relating to at least one of a conduction mode of the current and a current value.

7. The vehicular power control apparatus according to claim 1, wherein the internal combustion engine operation instruction unit gives an operation instruction adapted to a vehicle operation state of the hybrid vehicle to the internal combustion engine control unit.

8. The vehicular power control apparatus according to claim 1, wherein the internal combustion engine operation instruction unit gives an instruction, which limits a rotation speed of the internal combustion engine by changing an output adjustment parameter of the internal combustion engine based on an internal combustion engine output upper limit characteristic at a time of the abnormality calculated based on a correlation among a rotation speed of the AC motor, temperature of the electric power supply passage, a current flowing to the electric power supply passage and the rotation speed of the internal combustion engine, to the internal combustion engine control unit.

9. The vehicular power control apparatus according to claim 1, wherein the internal combustion engine operation instruction unit gives an instruction, which limits a rotation speed of the internal combustion engine by changing an output adjustment parameter of the internal combustion engine to perform traveling continuation or traveling stop of the vehicle in conformity with vehicle operation information including at least one of an acceleration/declaration amount of the hybrid vehicle, an acceleration/declaration frequency, a steering amount, a steering frequency and a vehicle speed, and a degree of the abnormality obtained based on temperature of the electric power supply passage and/or a current flowing to the electric power supply passage, to the internal combustion engine control unit.

* * * * *